US012272475B2

(12) United States Patent
Cui et al.

(10) Patent No.: US 12,272,475 B2
(45) Date of Patent: Apr. 8, 2025

(54) MAGNETICALLY ANISOTROPIC BINDER-FREE FILMS CONTAINING DISCRETE HEXAFERRITE NANOPLATELETS

(71) Applicant: HRL Laboratories, LLC, Malibu, CA (US)

(72) Inventors: Shanying Cui, Calabasas, CA (US); Xin N. Guan, Monterey Park, CA (US); Adam F. Gross, Santa Monica, CA (US); Florian G. Herrault, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 292 days.

(21) Appl. No.: 17/682,478

(22) Filed: Feb. 28, 2022

(65) Prior Publication Data

US 2022/0351885 A1 Nov. 3, 2022

Related U.S. Application Data

(62) Division of application No. 16/592,477, filed on Oct. 3, 2019, now Pat. No. 11,295,882.

(Continued)

(51) Int. Cl.

*H01F 1/34* (2006.01)
*H01F 10/20* (2006.01)

(Continued)

(52) U.S. Cl.

CPC .......... *H01F 1/348* (2013.01); *H01F 10/205* (2013.01); *H01F 10/28* (2013.01); *H01F 10/30* (2013.01);

(Continued)

(58) Field of Classification Search

CPC .......... H01F 41/24; H01F 10/30; H01F 10/28; H01F 10/205; H01F 1/348

See application file for complete search history.

(56) References Cited

U.S. PATENT DOCUMENTS

2009/0297432 A1* 12/2009 Hill .................... C04B 35/2608 423/594.2
2010/0173101 A1 7/2010 Harris et al.
2019/0264005 A1* 8/2019 Horn, III ................ C08K 3/22

OTHER PUBLICATIONS

Sima Majidi, Fatemeh Zeinali Sehrig, Samad Mussa Farkhani, Mehdi Soleymani Goloujeh & Abolfazl Akbarzadeh (2016) Current methods for synthesis of magnetic nanoparticles, Artificial Cells, Nanomedicine, and Biotechnology, 44:2, 722-734 (Year: 2016).*

(Continued)

*Primary Examiner* — Kelly M Gambetta
(74) *Attorney, Agent, or Firm* — O'Connor & Company; Ryan P. O'Connor

(57) ABSTRACT

Some variations provide a magnetically anisotropic structure comprising a hexaferrite film disposed on a substrate, wherein the hexaferrite film contains a plurality of discrete and aligned magnetic hexaferrite particles, wherein the hexaferrite film is characterized by an average film thickness from about 1 micron to about 500 microns, and wherein the hexaferrite film contains less than 2 wt % organic matter. The hexaferrite film does not require a binder. Discrete particles are not sintered or annealed together because the maximum processing temperature to fabricate the structure is 500° C. or less, such as 250° C. or less. The magnetic hexaferrite particles may contain barium hexaferrite ($BaFe_{12}O_{19}$) and/or strontium hexaferrite ($SrFe_{12}O_{19}$). The hexaferrite film may be characterized by a remanence-to-saturation magnetization ratio of at least 0.7. Methods of making and using the magnetically anisotropic structure are also described.

39 Claims, 13 Drawing Sheets

Related U.S. Application Data

(60) Provisional application No. 62/804,291, filed on Feb. 12, 2019.

(51) Int. Cl.
*H01F 10/28* (2006.01)
*H01F 10/30* (2006.01)
*H01F 41/24* (2006.01)
*H01P 1/36* (2006.01)
*H01P 1/38* (2006.01)

(52) U.S. Cl.
CPC ................ *H01F 41/24* (2013.01); *H01P 1/36* (2013.01); *H01P 1/38* (2013.01)

(56) References Cited

OTHER PUBLICATIONS

Mosleh et al., "Effect of annealing temperature on structural and magnetic properties of BaFe12O19 hexaferrite nanoparticles", Ceramics International 40 (2014) 7279-7284.
Ferk et al., "Monolithic Magneto-Optical Nanocomposites of Barium Hexaferrite Platelets in PMMA", Scientific Reports 5:11395 | DOI: 10.1038/srep11395.
Lisjak et al., "The Alignment of Barium Ferrite Nanoparticles from Their Suspensions in Electric and Magnetic Fields", J. Phys. Chem. B 2013, 117, 1644-1650.
Pullar, "Hexagonal ferrites: A review of the synthesis, properties and applications of hexaferrite ceramics", Progress in Materials Science 57 (2012) 1191-1334.
Chen et al, "Microwave and magnetic properties of self-biased barium hexaferrite screen printed thick films", Journal of Applied Physics 99, 08M904 (2006).
Notice of Allowance, U.S. Appl. No. 16/203,788 dated Jul. 9, 2020, citing Rangappa et al., "Preparation of Ba-Hexaferrite Nanocrystals by an Organic Ligand-Assisted Supercritical Water Process", 2010, Crystal Growth & Design, 10, 11-15 (Year: 2010) that is pp. 20-24 of the Notice of Allowance.

* cited by examiner

1000

MAGNETICALLY ANISOTROPIC BINDER-FREE FILMS CONTAINING DISCRETE HEXAFERRITE NANOPLATELETS

PRIORITY DATA

This patent application is a divisional application of U.S. patent application Ser. No. 16/592,477, filed on Oct. 13, 2019, which claims priority to U.S. Provisional Patent App. No. 62/804,291, filed on Feb. 12, 2019, which is hereby incorporated by reference herein.

STATEMENT REGARDING FEDERALLY SPONSORED RESEARCH OR DEVELOPMENT

This invention was made with Government support under U.S. Department of Defense Contract No. W911NF-17-C-0023. The Government has certain rights in this invention.

FIELD OF THE INVENTION

The present invention generally relates to hexaferrite nanoparticles and magnetically anisotropic films assembled from the hexaferrite nanoparticles.

BACKGROUND OF THE INVENTION

Integrated microwave and millimeter-wave magnetic components are of particular interest for military applications in which ultra-compact, highly-integrated subsystems are needed (e.g., radars, transmitters, receivers, etc.). Such magnetic components are also desired for many other applications, such as magnetic sensors, actuators, transformers, inductors, etc. Magnetic devices are key components of many microelectronic chips and systems.

There are a group of ferrites with a hexagonal crystal structure, known as hexaferrites (hexagonal ferrites). Hexaferrites are important materials commercially and technologically. Hexagonal ferrites are the most common magnetic materials used today, with the M-type (this is a subset of hexaferrites including $BaFe_{12}O_{19}$ and $SrFe_{12}O_{19}$) barium hexaferrite alone accounting for 50% of the total magnetic materials manufactured globally, at over 300,000 ton/year.

The hexagonal ferrites are all ferrimagnetic materials, and their magnetic properties are intrinsically linked to their crystalline structures. In addition to their general magnetic properties and uses as magnetic materials, there has been an explosion of interest in hexaferrites in the last decade for more exotic applications—such as electronic components and electromagnetic absorbers, composite materials, nanocomposites, magnetoelectric/multiferroic applications, and orientation in ferrite fibers.

Self-biased hexaferrite materials are enabling for magnetic microwave components such as circulators. However, hexaferrite materials are currently made from sintered powder and packaged with conductors as surface-mount components. Integration with integrated circuits is done at the board level with die attach (e.g., silver epoxy and solder) and wire bonds or printed circuit board wiring. These configurations result in poor use of space on devices and order-of-magnitude larger electronic subsystems than would be possible if self-biased hexaferrites could be selectively deposited as thick areas on semiconductor wafers as part of an integrated circuit fabrication process flow. However, existing methods to create integrated films require high-temperature annealing (above 500° C., such as about 900° C.) to create crystalline alignment and thus self-biasing features. These high-temperature treatments are not compatible with integrated circuit fabrication flows.

Most approaches to forming ferrites (e.g., sol-gel, citrate ligand-assisted synthesis, or mix and bake) create a precursor solid with a wide size distribution, followed by a thermal treatment in a furnace to form the ferrite crystal structure. There is significant atomic movement as the precursor elements combine into one crystal structure. The nanoparticle shape grows in size and the particles become more polydisperse with additional heating and atomic movement. Additionally, the conventional furnace treatment results in loss of surface chemical groups (such as hydroxides or dangling bonds) which leads to the loss of nanoparticle dispersion. Hexaferrite processing is reviewed in Harris et al., "Recent advances in processing and applications of microwave ferrites" *Journal of Magnetism and Magnetic Materials,* 2009, 321, 2035.

Pullar, "Hexagonal ferrites: A review of the synthesis, properties and applications of hexaferrite ceramics," *Progress in Materials Science* 57 (2012) 1191-1334 describes methods such as precipitation, combustion, and sol-gel synthesis of ferrites. Pullar explains that the formation of hexagonal ferrites is a complicated series of chemical reactions at elevated temperatures (>700° C.).

Wu et al., "Synthesis and assembly of barium-doped iron oxide nanoparticles and nanomagnets," *Nanoscale* 7 (2015) 16165-16169 shows the synthesis of round particles that lose shape upon high-temperature furnace treatment-induced crystallization and form a film of agglomerated, not discrete nanoparticles.

U.S. Patent App. Pub. No. 20100173101A1 describes forming a wet paste of hexaferrites with binder material to create self-biased barium hexaferrite films of perpendicular magnetic anisotropy. The film density is low due to the need for an organic binder. Moreover, a sintering temperature between 850° C. and 1300° C. is required to form the anisotropic film.

Chao et al., "Millimeter wave hexagonal nano-ferrite circulator on silicon CMOS substrate", 2014 *IEEE MTT-S International Microwave Symposium* (*IMS*2014), describe a photoresist/$BaFe_{12}O_{19}$ nanoparticle composite for on-chip circulators. No patternability is demonstrated, and it is well-known that fill factor must remain low (<30%) to retain photodefinable capabilities. Resist/nanoparticle composites are also very sensitive to temperature.

Ferk et al., "Monolithic Magneto-Optical Nanocomposites of Barium Hexaferrite Platelets in PMMA" *Scientific Reports,* 2015, 5, 11395 describe highly magnetically anisotropic hexaferrite platelets. However, only up to 0.27% weight hexaferrite platelets are included in the disclosed composites.

Lisjak and Ovtar, "The Alignment of Barium Ferrite Nanoparticles from Their Suspensions in Electric and Magnetic Fields" *Journal of Physical Chemistry B,* 2013, 117, 1644 describe drying barium hexaferrite nanoparticles in both a magnetic and electric field. Magnetic anisotropy is not shown until there is an annealing step at 1150° C. for 5 hours.

In view of the art, there is a desire for magnetically anisotropic structures that exhibit high ratios of remanent to saturation magnetization. It is desired for the magnetically anisotropic structures to be fabricated at a low temperature, such as 250° C. or less, so that the magnetically anisotropic film may be monolithically integrated into an integrated-circuit fabrication process.

SUMMARY OF THE INVENTION

The present invention addresses the aforementioned needs in the art, as will now be summarized and then further described in detail below.

Some variations provide a magnetically anisotropic structure comprising a magnetically anisotropic film disposed directly or indirectly on a substrate, wherein the magnetically anisotropic film contains a plurality of discrete magnetic hexaferrite particles, wherein the magnetically anisotropic film is characterized by an average film thickness from about 1 micron to about 500 microns, and wherein the magnetically anisotropic film contains less than 2 wt % organic matter. Discrete nanoparticles are not sintered or annealed together.

The magnetically anisotropic film contains at least 0.5 wt % of the plurality of discrete magnetic nanoparticles, such as at least 1 wt %, 5 wt %, 10 wt %, 20 wt %, 30 wt %, 40 wt %, 50 wt %, 60 wt %, 70 wt %, 80 wt %, 90 wt %, 95 wt %, or 99 wt % of the plurality of discrete magnetic nanoparticles.

In some embodiments, the magnetically anisotropic film does not contain a binder for the discrete magnetic hexaferrite particles. The magnetically anisotropic film may contain less than 1.5, 1.0, 0.5, 0.4, 0.3, 0.2, or 0.1 wt % organic matter, such as no detectible organic matter. In some embodiments, the magnetically anisotropic film contains less than 2 wt % of combustible, inorganic matter.

Preferably, the discrete magnetic hexaferrite particles are aligned with a full width at half maximum angular distribution of the hexaferrite particle c-axis direction of about ±20° or less.

In some embodiments, the discrete magnetic hexaferrite particles have a packing density of at least 50% within the magnetically anisotropic film.

In some embodiments, the film thickness is from about 10 microns to about 200 microns. The lateral dimension of the film may vary widely, from micrometers to meters.

In some embodiments, the discrete magnetic hexaferrite particles have a maximum dimension from about 500 nanometers to about 2 microns. In certain embodiments, the discrete magnetic hexaferrite particles are hexagonal platelets with an average diameter from about 50 nanometers to about 5 microns, and an average thickness from about 5 nanometers to about 100 nanometers.

The discrete magnetic hexaferrite particles may contain barium hexaferrite ($BaFe_{12}O_{19}$), strontium hexaferrite ($SrFe_{12}O_{19}$), or a combination thereof. In some embodiments, pure-phase hexaferrites are employed.

The discrete magnetic hexaferrite particles may exhibit an average saturation magnetization from about 25 emu/g to about 60 emu/g, measured at 25° C. The discrete magnetic hexaferrite particles may exhibit an average magnetic coercivity from about 600 Oe to about 4000 Oe, measured at 25° C. The magnetically anisotropic film may be characterized by a saturation magnetization that is greater than 50 emu/g. The magnetically anisotropic film may be characterized by a remanence-to-saturation magnetization ratio that is at least 0.7.

The substrate may be fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof. A substrate may be a material within a printed circuit board that mechanically supports and electrically connects components using conductive tracks, pads, and/or other features etched from one or more conductive layers laminated onto and/or between layers of the substrate.

In some embodiments, the substrate is fabricated from a substrate material that contains a positive surface charge or a negative surface charge. For example, the substrate material may be surface-treated with a compound selected from the group consisting of thiols, silanes, alkoxysilanes, phosphonic acids, and combinations thereof, and wherein the compound optionally contains a functional group selected from the group consisting of amine, imine, ammonium, carboxylate, sulfate, phosphate, and combinations thereof. Alternatively, or additionally, the substrate material may be surface-treated with a polymer containing a functional group selected from the group consisting of amine, imine, ammonium, carboxylate, sulfate, phosphate, and combinations thereof. The polymer may be selected from the group consisting of poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), heparin, dextran sulfate, λ-carrageenan, pentosan polysulfate, mannan sulfate, chondroitin sulfate, poly(carboxymethylcellulose), poly(D-lysine), poly(L-lysine), poly(L-glutamic acid), poly(L-aspartic acid), poly(γ-glutamic acid), and combinations thereof, for example.

In some embodiments, the magnetically anisotropic film is immobilized onto the substrate with a coating applied to the magnetically anisotropic film and/or to the substrate. The coating may contain a material selected from the group consisting of gold, palladium, silica, alumina, hafnia ($HfO_2$), and combinations thereof, for example.

In some embodiments, the substrate is a patterned substrate, and the magnetically anisotropic film is a patterned magnetically anisotropic film. Many patterns and pattern length scales are possible. For example, a pattern may include a 1:1 aspect ratio of film height to feature thickness. The patterned magnetically anisotropic film may be an element of a microelectronics component selected from the group consisting of a circulator, an isolator, a non-reciprocal component, and a biasing magnet.

In some embodiments, the magnetically anisotropic film is encapsulated by a polymer selected from the group consisting of epoxies, silicones, polyp-xylylene), and combinations thereof. Other polymers may be used for encapsulating the film.

In some embodiments, the magnetically anisotropic structure is disposed on or within an integrated-circuit chip. Because the maximum processing temperature is 500° C. or less, and preferably 250° C. or less, the components of the integrated-circuit chip are not damaged. The magnetically anisotropic film may be monolithically integrated into an integrated-circuit process in which the maximum processing temperature after transistor fabrication is below 500° C., and preferably below 250° C., thus preventing high-temperature annealing of the film.

Some variations of the invention provide a magnetically anisotropic structure produced by a process comprising:

(a) synthesizing or obtaining magnetic hexaferrite particles;

(b) if the magnetic hexaferrite particles are agglomerated, mechanically treating the magnetic hexaferrite particles to form discrete particles;

(c) combining the magnetic hexaferrite particles with a solvent, to generate a dispersion;

(d) depositing the magnetic hexaferrite particles onto a substrate via drying and/or charge-titration assembly, to generate a magnetically anisotropic film of aligned, discrete magnetic hexaferrite particles disposed on the substrate;

(e) optionally embedding the magnetically anisotropic film in a polymer; and (f) recovering a magnetically anisotropic structure containing the magnetically anisotropic film, the substrate, and, if present, the polymer, wherein the maximum processing temperature during said method is 500° C. or less, such as 250° C. or less.

Some variations of the invention provide a method of making a magnetically anisotropic structure, the method comprising:

(a) synthesizing or obtaining magnetic hexaferrite particles;

(b) if the magnetic hexaferrite particles are agglomerated, mechanically treating the magnetic hexaferrite particles to form discrete particles;

(c) combining the magnetic hexaferrite particles with a solvent, to generate a dispersion;

(d) depositing the magnetic hexaferrite particles onto a substrate via drying and/or charge-titration assembly, to generate a magnetically anisotropic film of aligned, discrete magnetic hexaferrite particles disposed on the substrate;

(e) optionally embedding the magnetically anisotropic film in a polymer; and (f) recovering a magnetically anisotropic structure containing the magnetically anisotropic film, the substrate, and, if present, the polymer, wherein the maximum processing temperature during said method is 500° C. or less, such as 250° C. or less.

DETAILED DESCRIPTION OF EMBODIMENTS OF THE INVENTION

Figure 1:
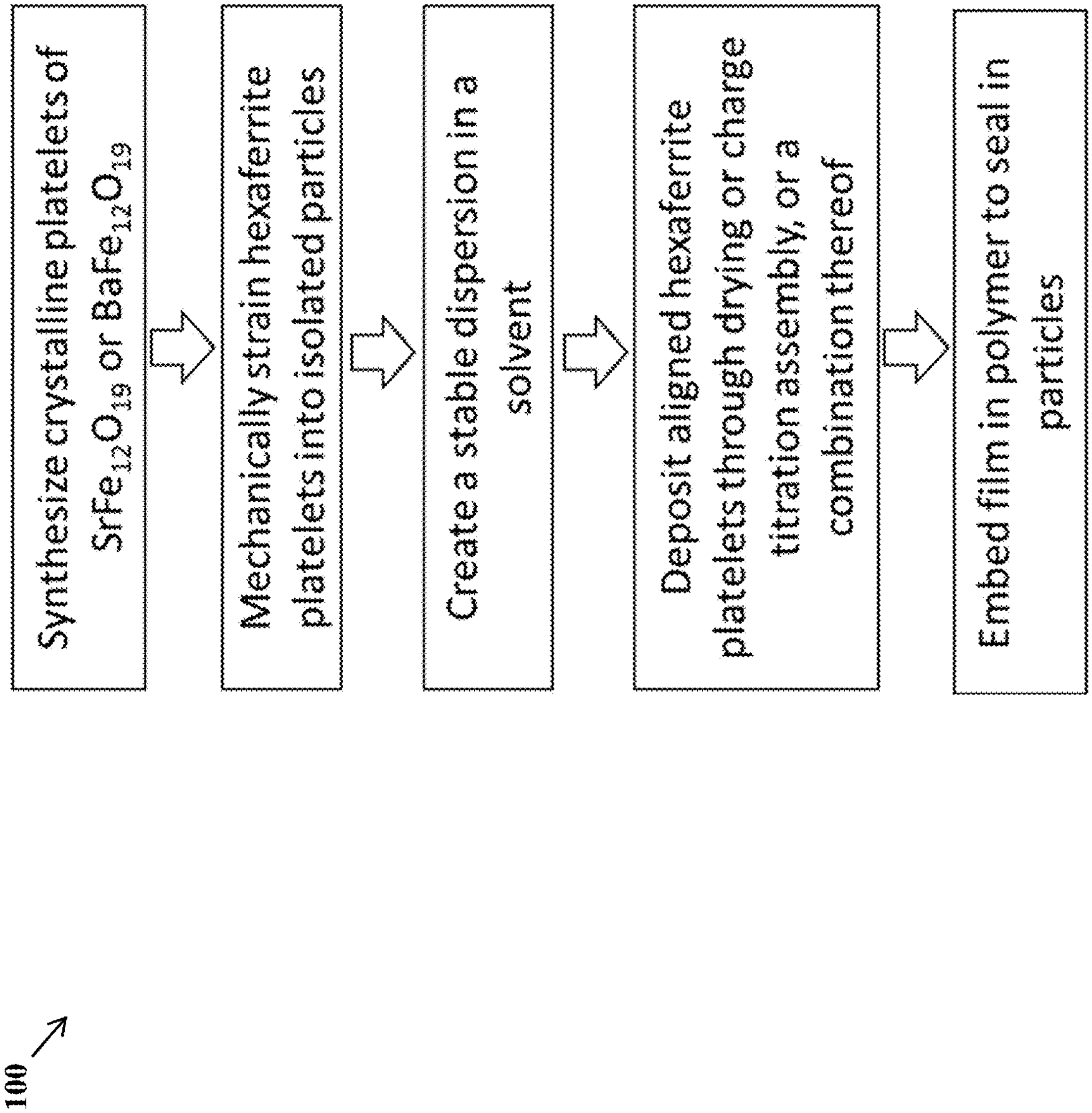
FIG. 1 is a flowchart for an exemplary method to form a magnetically anisotropic structure with a hexaferrite film, in some variations.

The films, compositions, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide a film on a substrate, wherein the film contains hexaferrite particles and wherein the film has not undergone high-temperature sintering. The hexaferrite particles are large enough to exhibit magnetic anisotropy without high-temperature annealing, while being small enough to suspend in a dispersion without organic binders. The hexaferrite particles are isolated from each other in the dispersion. An assembly process yields a thin film of discrete and aligned hexaferrite particles (e.g., plates) on a substrate. This physical alignment results in a magnetic material with high remanent magnetization. The magnetic material can be monolithically integrated into integrated circuits and electronic devices, since the film does not experience a high-temperature burn-out that would damage electrical components of a chip.

As disclosed herein, crystalline hexaferrite nanoparticles and/or microparticles that exhibit high magnetic quality are synthesized. The hexaferrite nanoparticles and/or microparticles are then treated to create a dispersion of isolated particles (e.g., platelets) in solution. The dispersion is deposited through drying, electrostatic techniques, or charge-titration techniques, and without high-temperature (>500° C.) sintering, to fabricate hexaferrite films with aligned and discrete particles. The aligned films may exhibit high ratios (about 0.7 or greater) of remanent magnetization to saturation magnetization. Other features, in various embodiments, include a high packing density of hexaferrite particles, films that are greater than 30 microns thick, perpendicular magnetic anisotropy, and patternability.

Some variations provide a magnetically anisotropic structure comprising a magnetically anisotropic film disposed directly or indirectly on a substrate, wherein the magnetically anisotropic film contains a plurality of discrete magnetic hexaferrite particles, wherein the magnetically anisotropic film is characterized by an average film thickness from about 1 micron to about 500 microns, and wherein the magnetically anisotropic film contains less than 2 wt % organic matter, such as less than 1.5 wt %, 1.0 wt %, 0.5 wt %, 0.4 wt %, 0.3 wt %, 0.2 wt %, 0.1 wt %, 0.05 wt %, or 0.01 wt % organic matter, such as no detectible organic matter. For purposes of this disclosure, an "organic" material means a material containing C, H, and O.

The magnetically anisotropic film contains at least 0.5 wt % of the plurality of discrete magnetic nanoparticles, such as at least 1 wt %, 5 wt %, 10 wt %, 20 wt %, 30 wt %, 40 wt %, 50 wt %, 60 wt %, 70 wt %, 80 wt %, 90 wt %, 95 wt %, or 99 wt % of the plurality of discrete magnetic nanoparticles. These concentrations are based on the total weight of the magnetically anisotropic film. In these or other embodiments, the magnetically anisotropic film contains at least 1 vol %, 5 vol %, 10 vol %, 20 vol %, 30 vol %, 40 vol %, or 50 vol % of the plurality of discrete magnetic nanoparticles.

"Hexaferrite" or equivalently "hexagonal ferrite" is a ceramic compound with a hexagonal crystal structure, composed of iron oxide ($Fe_2O_3$) combined chemically with one or more additional metallic elements in a hexagonal crystal structure. A hexagonal crystal structure is well-known in the art, with a hexagonal lattice system having one six-fold axis of rotation. Examples of hexaferrites include barium ferrite, $BaFe_{12}O_{19}$, and strontium ferrite, $SrFe_{12}O_{19}$.

The magnetic hexaferrite particles may be nanoparticles or microparticles. Magnetic hexaferrite nanoparticles may have an average particle size from about 10 nanometers to about 1000 nanometers, measured as the width (long dimension). Magnetic hexaferrite microparticles may have an average particle size from about 1 micron to about 100 microns, measured as the width. In some embodiments, the magnetic hexaferrite particles have an average particle size from about 100 nanometers to about 5 microns, measured as the width. Magnetic hexaferrite particles may have an average particle thickness (short dimension) from about 1 nanometer to about 10 microns, such as from about 10 nanometers to about 1000 nanometers, for example. In the case of hexagonal prisms, the thickness is the height of the prism, which is usually less than the prism width.

In certain embodiments, the magnetic hexaferrite particles are referred to as platelets or nanoplatelets. A "platelet" is a polygonal prism. The polygonal prisms may be hexagonal prisms with 8 faces, 18 edges, and 12 vertices. Other polygonal prisms may be present. The polygonal prisms will be hexagonal prisms when they contain single crystals that have hexagonal crystal structure. However, the present invention is not limited to single-crystal materials. The presence of crystal defects, grain boundaries, and impurities (including other types of crystals and amorphous regions) means that the particles themselves may be of various shapes.

Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The magnetic hexaferrite particles may have a variety of particle shapes. In preferred embodiments, the particles are polygonal prisms. Exemplary polygonal prisms are thin hexagonal plates, wherein the ratio of the plate thickness to plate length is from about 1:20 to about 1:200.

"Discrete" particles means that the particles are physically separate particles. There may be gaps (of space, liquid solvent, or materials) between discrete particles. Discrete particles may be adjacent to one another and there may be some amount of contact area, but that the particles are not physically fused together or physically continuous with each other. Physically continuous or physically fused particles are characterized by significant covalent bonding between particles, i.e., chemical bonds involving the sharing of electrons between atoms. The discrete particles herein may touch but do not form significant covalent bonds between one another. By "significant covalent bonding" between two particles, it is meant that the two particles do not remain as physically separate particles but rather have become one larger particle, as observed by scanning electron microscopy (SEM).

Figure 5:
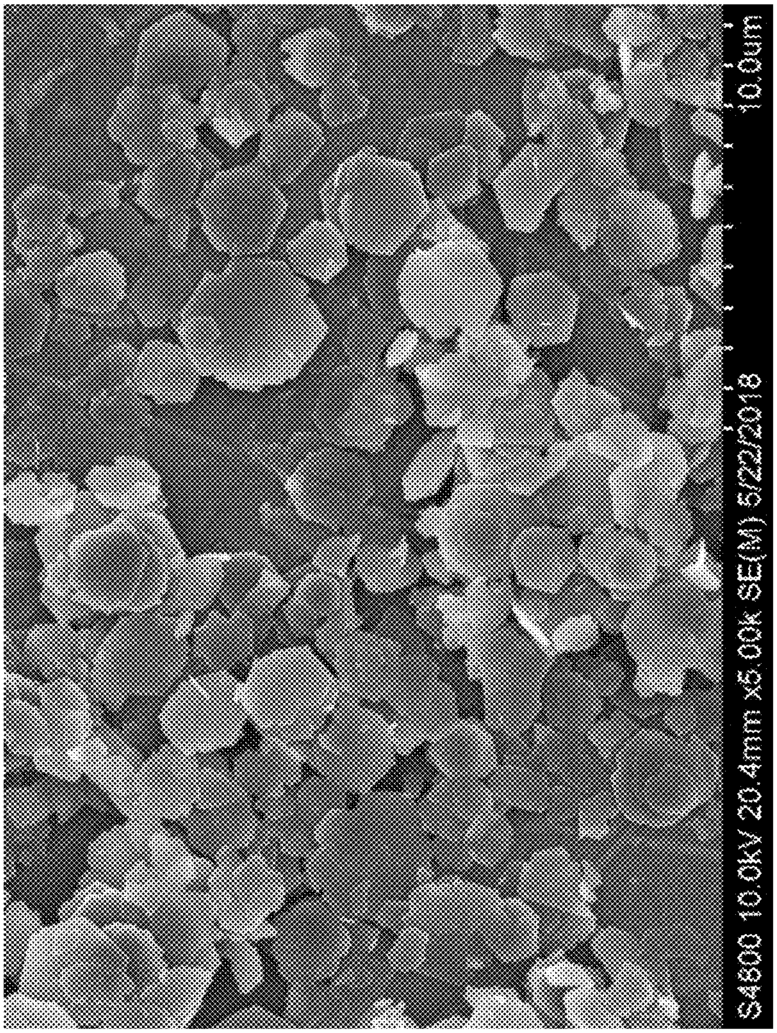
FIG. 5 is an SEM image (scale bar=10 μm) of mechanically agitated $SrFe_{12}O_{19}$ nanoparticles, revealing discrete and aligned plates, in Example 1.
Figure 8A:
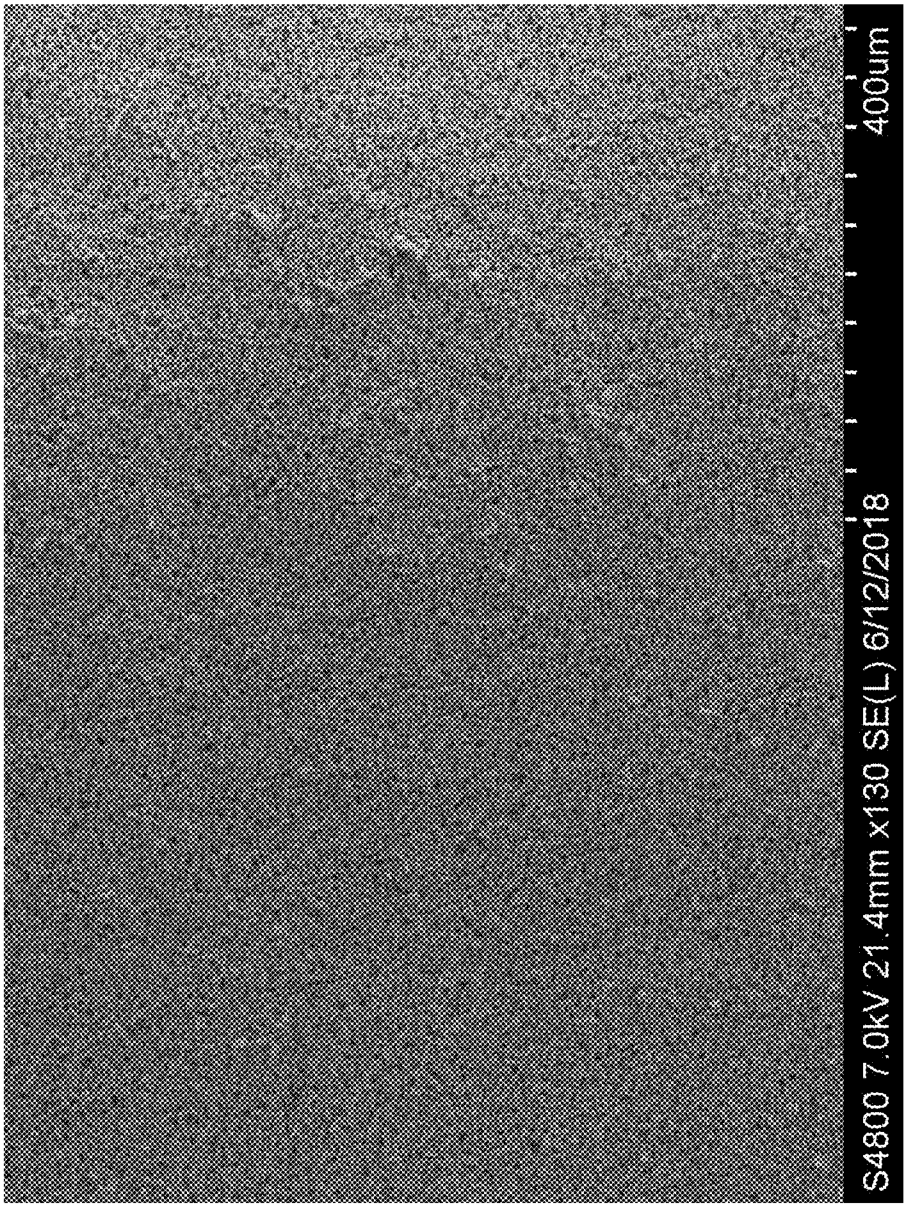
FIG. 8A is an SEM image (scale bar=400 μm) of a dried film of $SrFe_{12}O_{19}$ particles, in Example 2.
Figure 8B:
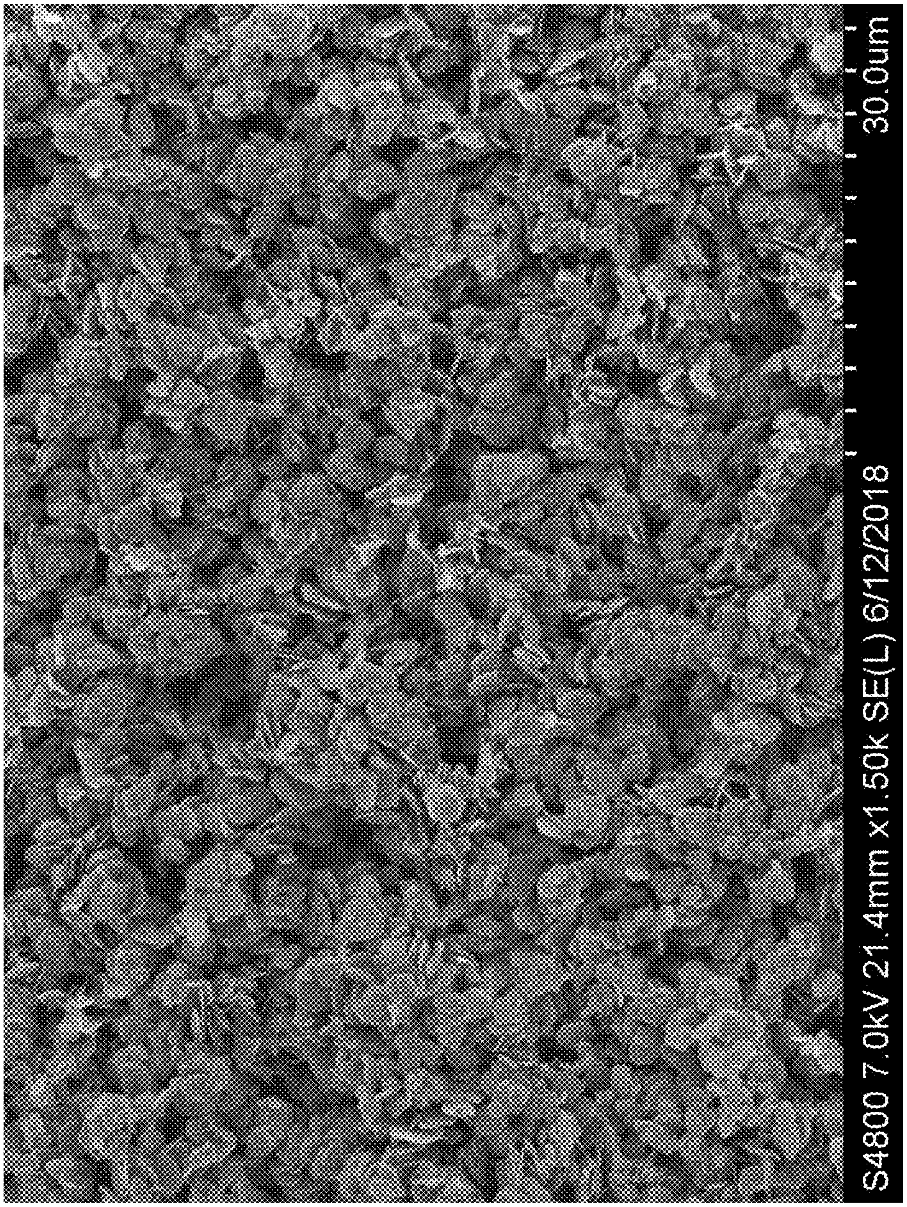
FIG. 8B is an SEM image (scale bar=30 μm) of a dried film of $SrFe_{12}O_{19}$ particles, in Example 2, revealing that the $SrFe_{12}O_{19}$ particles are discrete, and not annealed or sintered together.

Examples of discrete particles are shown in the SEM images of FIG. 5 (Example 1) as well as FIG. 8B (Example 2). In FIG. 5, discrete hexaferrite platelets are shown as produced via mechanical strain. Some of the platelets are completely isolated from other platelets, while some platelets are physically touching each other but remain distinctly observable as hexagonal shapes. In FIG. 8B, a dried film of discrete hexaferrite platelets is shown. Most or all of the platelets are physically touching each other but again remain distinctly observable as hexagonal shapes. Even in regions that appear to include somewhat agglomerated amounts of hexaferrite platelets, there is no evidence in the SEM image that any two platelets have formed covalent bonds to become one larger particle. That is, discrete particles may be loosely agglomerated but not covalently bonded (tightly agglomerated). In some embodiments, discrete particles are crystallographically discontinuous across an interface so that adjacent particles have non-epitaxial interfaces.

Figure 11:
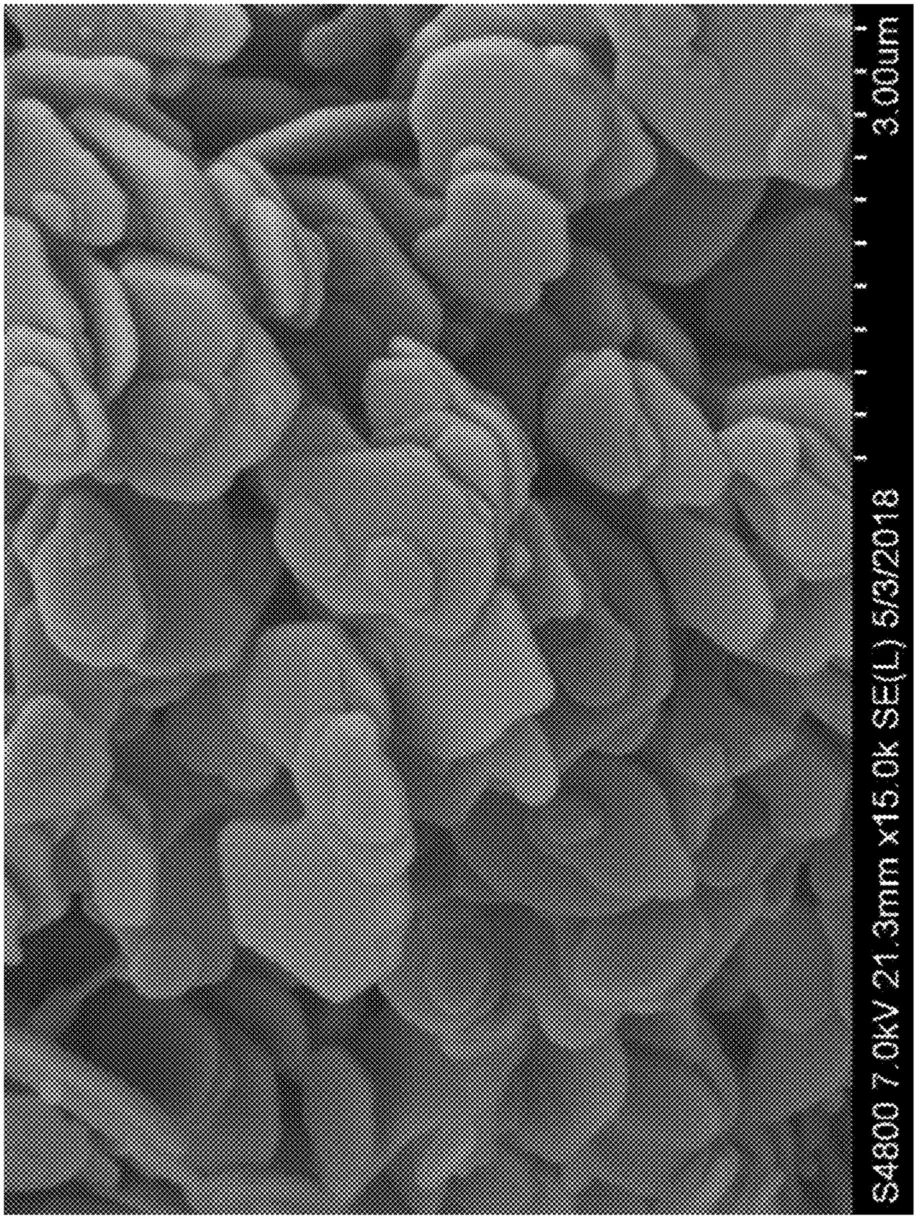
FIG. 11 shows an SEM image (scale bar=3 μm) showing $SrFe_{12}O_{19}$ particles that are annealed at 800° C., in the Comparative Example.

By contrast, an example of non-discrete particles can be seen in FIGS. 2B and 2C of U.S. Patent App. Pub. No. 2010/0173101 to Harris et al., published Jul. 8, 2010 (hereinafter, "Harris"), which is hereby incorporated by reference. In these SEM images, the initially finely-grained magnetic particles have fused together to form many continuous regions. The particles do not remain as physically separate particles but rather have become larger particles. This is observable in FIGS. 2B and 2C of Harris because there are domains of significantly varying size (from about 1 micron to about 10 microns) and there is no evidence of individual, finely-grained particles that were used in the synthesis (FIG. 2A of Harris). Harris at paragraph [0041] even teaches that "in FIG. 2B, the grains have grown in size, especially along the film plane, and the film appears to have a higher density, demonstrative of the appreciable and advantageous densification and grain growth that occurs as a result of the high-temperature sintering steps." The thermal treatment by Harris causes particle annealing or sintering that results in fused nanoparticles—not discrete particles. Without being limited by theory, it is believed that hexaferrite particles cannot remain discrete under film sintering at temperatures exceeding 500° C. Also refer to the Comparative Example and FIGS. 11 and 12 herein.

The magnetic hexaferrite film may contain a large number of discrete magnetic hexaferrite particles, such as about 100, about $10^3$, about $10^4$, about $10^5$, about $10^6$, about $10^7$, or more. The magnetic hexaferrite film thickness may vary from about 1 micron to about 500 microns, such as from about 10 microns to about 200 microns. In some embodiments, the magnetic hexaferrite film thickness is at least 30 microns. The lateral dimension of the film may vary widely, from microns to hundreds of millimeters.

A "magnetically anisotropic" structure or material means that the structure or material exhibits magnetic properties (remanence and coercivity) that is different out of plane from in plane. In this disclosure, a magnetically anisotropic structure or material is characterized by a ratio of remanent magnetization to saturation magnetization of at least 0.5, as measured through the thickness of the material, perpendicular to the substrate surface (not longitudinal to the surface). Out-of-plane magnetic squareness with a ratio of remanent magnetization to saturation magnetization of at least 0.7 means there is strong and permanent out-of-plane magnetization.

The discrete magnetic hexaferrite particles may exhibit an average saturation magnetization from about 25 emu/g to about 60 emu/g, measured at 25° C. The discrete magnetic hexaferrite particles may exhibit an average magnetic coercivity from about 600 Oe to about 4000 Oe, measured at 25° C. The magnetically anisotropic film may be characterized by a saturation magnetization that is greater than 50 emu/g. The magnetically anisotropic film may be characterized by a remanence-to-saturation magnetization ratio that is at least 0.5, preferably at least 0.6, and more preferably at least about 0.7. In this disclosure, in reference to remanence-to-saturation magnetization ratio, "at least about 0.7" means at least 0.65.

In certain embodiments, the hexaferrite particles are characterized by a remanence-to-saturation magnetization ratio greater than 0.85. This is useful for self-biased hexaferrite particles. Self-biased hexaferrite means that the material intrinsic remanent magnetization is strong enough to eliminate the need for an external magnetic bias field (typically from a permanent magnet). Self-biasing is generally defined as a material with a remanence-to-saturation ratio greater than 0.85.

The substrate may be fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof. A substrate may be a material within a printed circuit board that mechanically supports and electrically connects components using conductive tracks, pads, and/or other features etched from one or more conductive layers laminated onto and/or between layers of the substrate.

In some embodiments, the substrate is fabricated from a substrate material that contains a positive surface charge or a negative surface charge. For example, the substrate material may be surface-treated with a compound selected from the group consisting of thiols, silanes, alkoxysilanes, phosphonic acids, and combinations thereof, and wherein the compound optionally contains a functional group selected from the group consisting of amine, imine, ammonium, carboxylate, sulfate, phosphate, and combinations thereof. Alternatively, or additionally, the substrate material may be surface-treated with a polymer containing a functional group selected from the group consisting of amine, imine, ammonium, carboxylate, sulfate, phosphate, and combinations thereof. The polymer may be selected from the group consisting of poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), heparin, dextran sulfate, λ-carrageenan, pentosan polysulfate, mannan sulfate, chondroitin sulfate, poly(carboxymethylcellulose), poly(D-lysine), poly(L-lysine), poly(L-glutamic acid), poly(L-aspartic acid), poly(γ-glutamic acid), and combinations thereof, for example.

The amount of substrate may vary widely within the overall magnetically anisotropic structure. The magnetically anisotropic structure may contain at least, or at most, about 5 wt %, 10 wt %, 20 wt %, 30 wt %, 40 wt %, 50 wt %, 60 wt %, 70 wt %, 80 wt %, 90 wt %, 95 wt %, or 99 wt % of substrate.

In some embodiments, the magnetically anisotropic film is immobilized onto the substrate with a coating applied to the magnetically anisotropic film and/or to the substrate. The coating may contain a material selected from the group consisting of gold, palladium, silica, alumina, hafnia ($HfO_2$), and combinations thereof, for example.

In some embodiments, the substrate is a patterned substrate, and the magnetically anisotropic film is a patterned magnetically anisotropic film. Many patterns and pattern length scales are possible. For example, a pattern may include a 1:1 aspect ratio of film height to feature thickness. The patterned magnetically anisotropic film may be an element of a microelectronics component selected from the group consisting of a circulator, an isolator, a non-reciprocal component, and a biasing magnet.

In some embodiments, the magnetically anisotropic film is encapsulated by a polymer selected from the group consisting of epoxies, silicones, polyp-xylylene), and combinations thereof. Other polymers may be used for encapsulating the film.

In some embodiments, the magnetically anisotropic structure is disposed on or within an integrated-circuit chip. The magnetically anisotropic film may be monolithically integrated into an integrated-circuit process in which maximum processing temperature after transistor fabrication is below 500° C., and preferably below 250° C. Because the maximum processing temperature is 500° C. or less, and preferably 250° C. or less, the components of the integrated-circuit chip are not damaged.

Fabrication of magnetically anisotropic structures will now be further described in exemplary detail, without limiting the scope of the invention. Hexaferrite nanoparticles may be synthesized using the following techniques, for example.

In the case of $BaFe_{12}O_{19}$ particles, barium nitrate (e.g., 0.1 mmol) and iron nitrate nonahydrate (e.g., 0.5 mmol) are dissolved in deoxygenated water (e.g., 1 mL). Sodium hydroxide (e.g., 25.7 mmol) and a ligand such as citric acid, ethylenediaminetetraacetic acid (EDTA), and/or ammonium thiocyanate (e.g., 0.24 mmol) are dissolved in deoxygenated water (e.g., 9 mL) with vigorous stirring. The sodium hydroxide solution is purged with nitrogen continuously while stirring for at least 10 minutes to inhibit the formation of barium carbonate later in the synthesis. The barium and iron nitrate solution is added drop by drop to the sodium hydroxide solution while stirring. The mixture is heated to 270° C. in a reactor, such as a Teflon-lined Parr vessel. Then the mixture is cooled to room temperature, and washed sequentially with nitric acid (e.g., 10 mM), acetone, and deionized water. The final $BaFe_{12}O_{19}$ particles are resuspended in deionized water.

In the case of $SrFe_{12}O_{19}$ particles, strontium chloride hexahydrate (e.g., 0.1 mmol) and iron chloride hexahydrate (e.g., 0.8 mmol) are dissolved in deoxygenated water (e.g., 1 mL). Sodium hydroxide (e.g., 58.3 mmol) is dissolved in deoxygenated water (e.g., 9 mL) with vigorous stirring. The sodium hydroxide solution is purged with nitrogen continuously while stirring for at least 10 minutes. The strontium and iron chloride solution is added drop by drop to the sodium hydroxide solution while stirring. The mixture is heated to 220° C. in a reactor, such as a Teflon-lined Parr vessel. Then the mixture is cooled to room temperature, and washed sequentially with nitric acid (e.g., 10 mM), acetone, and deionized water. The final $SrFe_{12}O_{19}$ particles are resuspended in deionized water.

Typically, it is desired to employ only $BaFe_{12}O_{19}$ particles, only $SrFe_{12}O_{19}$ particles, or only another type of hexaferrite particles, such as $BaCa_2Fe_{16}O_{27}$, $BaFe_{12-2x}Co_xTi_xO_{19}$ ($0 \leq x \leq 1$), $BaFe_{12-2x}Ru_xTi_xO_{19}$ ($0 \leq x \leq 1$), etc. A mixture of particles, such as $BaFe_{12}O_{19}$ and $SrFe_{12}O_{19}$ particles, may be desirable if particles are sized differently and therefore pack better, for example. Some embodiments utilize a chemical composition in which both barium and strontium are present in the crystal structure, $Ba_xSr_{1-x}Fe_{12}O_{19}$ ($0<x<1$). A single composition and crystal orientation of hexaferrite particles may be referred to as "single-phase hexaferrite particles." Single-phase hexaferrite particles, as determined by x-ray diffraction, are preferred.

Preferably, the hexaferrite particles are characterized by an average hexaferrite content of at least 80 wt %. In less-preferred embodiments, the average hexaferrite content is from about 60 wt % to 80 wt %. In certain preferred embodiments, the hexaferrite particles are characterized by an average hexaferrite content of at least 90 wt %, at least 95 wt %, at least 99 wt %, or essentially 100 wt %. Note that the calculation of hexaferrite content does not include any ligands attached to the hexaferrite particles.

When the hexaferrite content of the particles is less than 100 wt %, the other material may be $Fe_3O_4$, $Fe_2O_3$, or other iron oxides, barium oxides, strontium oxides, or impurities, for example. The material that is not hexaferrite may be crystalline or amorphous. As an example, $Fe_2O_3$ may be present within the hexaferrite particles, and that $Fe_2O_3$ itself may be crystalline or amorphous.

The crystallinity of the hexaferrite particles is distinct from the hexaferrite content since it is possible for the particles to contain amorphous regions of $BaFe_{12}O_{19}$ and/or $SrFe_{12}O_{19}$. As used herein, the "crystallinity" of the particles, and "crystalline hexaferrite" refer specifically to a hexagonal crystal structure, as measured by x-ray diffraction. Therefore, other crystal structures (such as trigonal crystals of $Fe_2O_3$) are not counted in the definition of crystallinity, or counted toward crystalline hexaferrite content. In various embodiments, the hexaferrite particles are characterized by an average percent of crystalline hexaferrite of at least 70%, at least 80%, at least 90%, at least 95%, or at least 99%.

Pullar, "Hexagonal ferrites: A review of the synthesis, properties and applications of hexaferrite ceramics", *Progress in Materials Science* 57 (2012) 1191-1334 is hereby incorporated by reference for its teachings of hexaferrite particle compositions. In various embodiments herein, in place of $BaFe_{12}O_{19}$ or $SrFe_{12}O_{19}$—or in addition to these hexaferrites—the hexaferrite particles contain one or more cobalt-titanium-substituted $BaFe_{12-2x}Co_xTi_xO_{19}$ ($0<x<2$) or $SrFe_{12-2x}Co_xTi_xO_{19}$ ($0<x<2$); Z-type ferrites, such as $Ba_3Co_2Fe_{24}O_{41}$; Y-type ferrites, such as $Ba_2Co_2Fe_{12}O_{22}$; W-type ferrites, such as $BaCo_2Fe_{16}O_{27}$; X-type ferrites, such as $Ba_2Co_2Fe_{28}O_{46}$; and/or U-type ferrites, such as $Ba_4Co_2Fe_{36}O_{60}$.

The hexaferrite particles may be synthesized in a solution with no additional ligands or surfactants, or with ligands such as (but not limited to) oleic acid, dodecylbenzenesulfonic acid, citric acid, EDTA, ammonium thiocyanate, and/or sodium oleate. Note that ammonium thiocyanate ($NH_4SCN$) is not organic as defined herein. The ligand (including components, atoms, or molecules thereof) is preferably not incorporated into the crystal structure of the hexaferrite particles, but rather is only bonded to the surface of the hexaferrite particles. The hexaferrite-ligand bond may be a chemical bond, an electrostatic bond, or physical adsorption (van der Waals forces).

In some embodiments, magnetic hexaferrite particles are obtained from a source, i.e. previously synthesized and/or synthesized by another entity. In some embodiments, magnetic hexaferrite particles are synthesized using procedures described in commonly owned U.S. patent application Ser. No. 16/203,788, filed on Nov. 29, 2018, which is hereby incorporated by reference herein. For example, synthesis techniques may utilize hydrothermal treatment at relatively low temperatures (about 100-400° C.) instead of furnace treatments at high temperatures (above 700° C.). It should be noted, however, that the synthesis of the magnetic hexaferrite particles may utilize high temperatures, such as above 700° C., prior to deposition of the hexaferrite particles to form a film. Once the film is formed, the maximum processing temperature is preferably below 500° C., and more preferably below 250° C. A furnace may be utilized to pretreat and crystallize the particles before film deposition.

A hydrothermal treatment can maintain the dispersability of particles in aqueous solution. In particular, molecular precursors may be dissolved in water with salts to provide particle dispersion. The material is heated in a reaction vessel and barium or strontium hexaferrite crystals are formed, with no required furnace treatment. Additionally, if a dispersion-enabling salt is included, the salt enables the formation of a ligand on the particle surface and the particle suspends in water without additional treatment.

Particles may be dispersed, i.e., dissolved and/or suspended as a colloid, in solution by adjusting the solution pH to increase the zeta potential above ±20 mV. In this disclosure, the notation "±20 mV" (for example) in reference to zeta potential means that the zeta potential is 20 mV in magnitude (absolute value) and may be either 20 mV or −20 mV; this does not refer to a range of values between −20 mV to 20 mV.

Without being limited by theory, it is believed that dissolved ions derived from salts react with each other under effective reaction conditions described above, leading to the formation of solid hexaferrite particles. In some embodiments, an additional salt contributes an anion or cation, simultaneously with the formation of the hexaferrite particles or sequentially to that (but during the synthesis), as a ligand on the surface of the hexaferrite particles. The ligand enhances the dispersion of the hexaferrite particles to avoid significant precipitation of those particles out of solution.

The reaction mixture during synthesis of hexaferrite particles is typically contained in a sealed reaction vessel, which may be at atmospheric pressure or under pressure or vacuum. In various embodiments, the reaction mixture during reaction is under a pressure selected from about 0.1 atm to about 10 atm, such as about 0.5 atm to about 5 atm, or about 1 atm. The reaction temperature during synthesis may be selected from about 100° C. to about 350° C., such as from about 200° C. to about 300° C. In various embodiments, the reaction temperature is about 125° C., 150° C., 175° C., 200° C., 225° C., 250° C., 275° C., 300° C., 325° C., 350° C., or 375° C. The synthesis may utilize a variety of types of reaction vessels, such as, but not limited to, batch reactors, semi-batch reactors, continuous stirred-tank reactors, and continuous tubular reactors. The reactor may be agitated or non-agitated.

The synthesized hexaferrite particles preferably have crystalline domain sizes of at least 30 nm, as estimated using the Scherrer equation on x-ray diffraction data. The Scherrer equation is a formula that relates the size of sub-micron particles, or crystallites, in a solid to the broadening of a peak in a diffraction pattern. The Scherrer equation is well-known; see Patterson, "The Scherrer Formula for X-Ray Particle Size Determination", *Phys. Rev.* 56 (10): 978-982, 1939, which is hereby incorporated by reference herein. In various embodiments, the synthesized hexaferrite particles have an average crystalline domain size of at least 10, 20, 30, 40, 50, 75, 100, 150, 200, 300, 400, 500, 600, 700, 800, or 900 nm.

The synthesized hexaferrite particles are typically shaped like hexagonal plates, with the c-axis (crystal orientation) being along the thickness of the plate. The hard magnetic axis for hexaferrites is along the c-axis, which is normal to the platelet surface. The hexaferrite particles are preferably characterized by magnetocrystalline anisotropy along the c-axis of the hexagonal structure.

The synthesized hexaferrite particles preferably exhibit an average saturation magnetization between 25 and 60 emu/g. In various embodiments, the synthesized hexaferrite particles exhibit an average saturation magnetization of about 25, 30, 35, 40, 45, 50, 55, or 60 emu/g.

The synthesized hexaferrite particles preferably exhibit an average magnetic coercivity between 600 and 4000 Oe. In various embodiments, the synthesized hexaferrite particles exhibit an average magnetic coercivity of about 600, 800, 1000, 1500, 2000, 2500, 3000, 3500, or 4000 Oe. In some embodiments, the synthesized hexaferrite particles exhibit an average magnetic coercivity of at least 1000 Oe, at least 2000 Oe, or at least 3000 Oe.

Following synthesis of the hexaferrite particles, they are dispersed in a solvent. The solvent may be selected from the group consisting of water, tert-butanol, iso-butanol, isopropanol, dimethyl sulfoxide, toluene, acetic acid, and combinations thereof. Any reference to "solution" of hexaferrite particles and solvent is equivalent herein to a dispersion of hexaferrite particles in the liquid solvent, in which the hexaferrite particles are not necessarily dissolved, but may be dispersed or suspended in the liquid solvent. The concentration of hexaferrite particles in the dispersion may be from about 0.1 mg/mL to about 100 mg/mL, such as from about 0.5 mg/mL to about 50 mg/mL, for example.

The synthesized hexaferrite particles may be mechanically treated to create isolated, individual particles. The hexaferrite particles, during synthesis, may undergo secondary nucleation, which results in intergrown platelets that are perpendicular or at random angles to one another (see FIG. 4). Consequently, assembled films from those platelets would have low density due to poor packing fraction and would contain crystallites with the axis of magnetocrystalline anisotropy along directions that are not parallel to the axis of magnetocrystalline anisotropy of other platelets. In order to achieve a film with high magnetic anisotropy, the intergrown platelets are preferably separated into individual plates by breaking apart the intergrown plates through mechanical agitation. Without such physical separation of intergrown platelets, alignment of the platelets is not possible geometrically. In some cases, the synthesized hexaferrite particles do not contain, or contain very little, intergrown platelets, in which case mechanical treatment is not necessary.

Mechanical treatment may be conducted prior to addition to solvent, or following solvent addition (i.e., the dispersed particles are mechanically treated in the solvent). Mechanical treatment prior to solvent addition may utilize another liquid to aid in breaking apart particles, or may be done with dry particles. Mechanical treatment of hexaferrite particles generally improves their dispersion in the solvent, by generating unagglomerated platelets.

There are other techniques to improve particle dispersion in the solvent, which may be done instead of, or in addition to, mechanical treatment. In some embodiments, the synthesized hexaferrite particles aggregate due to inherent magnetization within platelets. Such platelets may be separated into unagglomerated platelets through a degaussing mechanism. Degaussing is the process of decreasing or eliminating a remanent magnetic field, using a controlled magnetic field.

The synthesized hexaferrite particles may be treated with a ligand to improve dispersion. For example, the hexaferrite particles may be heated in a bath of dodecylbenzenesulfonic acid to a temperature of 50-150° C. for 1-4 hours. Note that treatment of the synthesized hexaferrite particles with a ligand is different from the option to utilize a ligand during synthesis of hexaferrite particles in solution. Whether or not a ligand is included in the initial synthesis, the synthesized hexaferrite particles may be treated with a ligand, which may be the same or different from any ligand(s) initially used.

The hexaferrite particles may be dispersed in water, polar protic solvents, polar aprotic solvents, or a combination thereof. For example, the hexaferrite particles may be dispersed in alcohols (e.g., ethanol or n-butanol) or organic acids (e.g., formic acid or acetic acid). The hexaferrite nanoparticles may be dispersed in polar aprotic solvents (e.g., acetone or tetrahydrofuran).

When the solvent is aqueous (contains at least some water), the dispersion of hexaferrite particles and solvent may be adjusted to a low pH or high pH that is far from the isoelectric point of the hexaferrite particles, to improve the particle dispersion. The isoelectric point of the particles is defined as the pH at which the particles exhibit a net zero surface charge. A low pH, such as pH 2 to 4, yields positively charged hexaferrite particles, which would electrostatically repulse and result in better dispersed solutions. A high pH, such as pH 9 to 11, yields negatively charged hexaferrite particles, which would electrostatically repulse and also result in better dispersed solutions.

Figure 3:
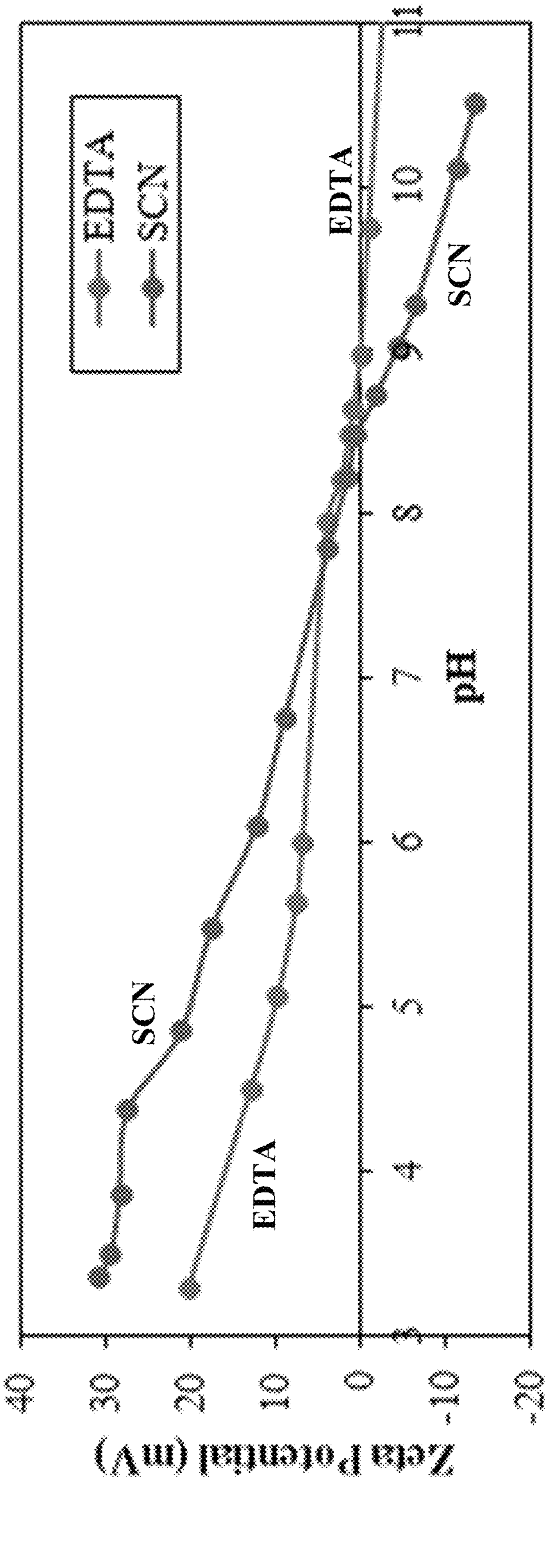
FIG. 3 is a plot of zeta potential versus pH for $BaFe_{12}O_{19}$ particles, in some embodiments.

The isoelectric point is measured with zeta potential versus pH titrations. For example, FIG. 3 shows zeta potential versus pH for $BaFe_{12}O_{19}$ particles coated with EDTA and thiocyanate (SCN) ligands. Both zeta potential curves show the particles have positive surface charges at pH<8 and are well-dispersed in water at acidic pH where the zeta potential is at least 20 mV (pH<5 for SCN and pH<3 for EDTA). As the pH is increased, the zeta potential decreases until the surface charge becomes zero at the isoelectric point between pH 8.5 and pH 9 for both EDTA and SCN.

The dispersion of hexaferrite particles is then deposited onto a substrate in an aligned manner. The substrate may be any suitable solid material, such as a glass slide, a fused silica wafer, a silicon wafer, a gallium nitride wafer, or a gallium arsenide wafer. The substrate is typically a flat or substantially flat surface, but could be curved, especially at the large scale of a device for which deviations from flatness do not negatively impact the magnetic properties of the hexaferrite films.

The substrate may be coated with a film, such as a layer of silicon dioxide or gold, for example. In some embodiments, the substrate is treated with one or more compounds that form an assembled organic monolayer, such as trimethoxysilane molecules on oxides or thiol molecules on gold. These assembled monolayers may be neutrally charged or may have either a positive or negative charge to give the substrate a charged surface. An example of such an organic molecule is 3-(trimethoxysilyl)propyl-N,N,N-trimethylammonium chloride. Alternatively, or additionally, polyelectrolytes may be bound to the assembled organic monolayers to create a more-uniform surface charge. Examples of polyelectrolytes include carboxymethylcellulose, polyacrylic acid, and poly(allylamine hydrochloride). A polyelectrolyte layer not only creates a uniformly charged surface to which the particles can electrostatically bind, but also improves adhesion of the particles to the substrate.

In some embodiments, the dispersion of hexaferrite particles is dried onto the substrate, in which the capillary forces during the drying process create a film of aligned and stacked plates. Optionally, the substrate-deposited hexaferrite particles may be dried between two magnets, under a magnetic-induction field ranging from 0.02 T to 1 T, for example. The magnetic field lines are much more uniform between two magnets, compared to one magnet. Optionally, the substrate-deposited hexaferrite particles may be dried between two electromagnets, under a varying magnetic field, ranging from 0 T to 1 T. A gradual ramp in magnetic field creates a more-controlled environment in which the particles may align with the substrate.

The hexaferrite particles, when dispersed in an aqueous solution, may be assembled onto a substrate through a charge-titration technique. A charge-titration technique involves starting at a low pH or a high pH and slowly titrating the pH towards the isoelectric point of the hexaferrite particles (or the average isoelectric point in the case of multiple types of hexaferrite particles). If the substrate is negatively charged, the starting pH is preferably low, such that the hexaferrite particles are positively charged initially. Conversely, if the substrate is positively charged, the starting pH is preferably high, such that the hexaferrite particles are negatively charged initially. During titration, a pH change may be achieved through a thermal base (e.g., urea), which breaks down and increases the pH at an elevated temperature, such as from 80° C. to 150° C. A pH change may be achieved with an acidic gas (e.g., $CO_2$) or a basic gas (e.g., $NH_3$), which fills the air above the solution and solubilizes into the solution. See commonly owned U.S. Pat. No. 10,189,718, issued Jan. 29, 2019, which is incorporated by reference for its teachings of charge-titration techniques that may be applied in this disclosure.

The dispersed hexaferrite particles may be deposited onto the substrate using a combination of the methods described above. For example, charge titration may be followed by drying, or charge titration may be conducted between two magnets or electromagnets.

In some embodiments, the substrate is patterned to produce a hexaferrite film having a geometric pattern. For example, if the substrate is coated and patterned with a photoresist, a modified lift-off technique may be used to create a patterned hexaferrite film. An organic binding layer, such as carboxymethylcellulose, may be employed to ensure good adherence of the hexaferrite film to the substrate (e.g., see Example 5 herein).

Following deposition of the hexaferrite particles onto the substrate as a hexaferrite film, a low-temperature treatment of the hexaferrite film may be performed to burn off organic material. The low-temperature treatment may be conducted, for example, at a temperature from about 200° C. to about 500° C. for a treatment time from about 10 minutes to about 8 hours in the presence of oxygen (e.g., air) to oxidize organic material. This low-temperature treatment may be performed whether or not organic ligands were used during synthesis, such as to purify the hexaferrite film by oxidizing residual or contaminant organic matter.

Optionally, the film adhesion to the substrate may be improved through a treatment that seals in the hexaferrite particles. The sealing treatment may be thermal, physical, or a combination thereof. In some embodiments, the sealing treatment includes exposing the film to a temperature from about 50° C. to about 450° C., to thermally cure an encapsulating polymer, to partially sinter the particles together, and/or to bind the particles to the substrate. An encapsulating polymer, such as a low-viscosity epoxy, may be used to seal in the particles on the substrate. The particles may be embedded in a vapor-deposited polymer, such as parylenes (poly(p-xylylene)). The particles may be embedded in a vapor-deposited metal film, such as gold, platinum, palladium, or a combination thereof. Combinations of sealing treatments may be employed, although a high-temperature treatment (if used) is preferably conducted prior to addition of encapsulating or vapor-deposited polymer(s). Note that the encapsulating polymer, vapor-deposited polymer, and/or vapor-deposited metal film are not added until after film deposition, which preserves a high magnetic density of the film.

Some variations of the invention provide a method of making a magnetically anisotropic structure, the method comprising:

(a) synthesizing or obtaining magnetic hexaferrite particles;
(b) if the magnetic hexaferrite particles are agglomerated, mechanically treating the magnetic hexaferrite particles to form discrete particles;
(c) combining the magnetic hexaferrite particles with a solvent, to generate a dispersion;
(d) depositing the magnetic hexaferrite particles onto a substrate via drying and/or charge-titration assembly, to generate a magnetically anisotropic film of aligned, discrete magnetic hexaferrite particles disposed on the substrate;
(e) optionally embedding the magnetically anisotropic film in a polymer; and
(f) recovering a magnetically anisotropic structure containing the magnetically anisotropic film, the substrate, and, if present, the polymer, wherein the maximum processing temperature during said method is 500° C. or less, such as 250° C. or less.

FIG. 1 is a flowchart for an exemplary method 100 to form a magnetically anisotropic structure with a hexaferrite film, in some variations. According to FIG. 1, crystalline hexaferrite platelets of $SrFe_{12}O_{19}$ or $BaFe_{12}O_{19}$ are first synthesized. The hexaferrite platelets are treated under mechanical strain (e.g., agitation) to isolate the hexaferrite particles as discrete platelets. A stable dispersion of discrete hexaferrite particles in solvent is created. Discrete hexaferrite platelets are deposited in an aligned fashion through drying and/or charge-titration assembly, to generate a hexaferrite film. Finally, the hexaferrite film is embedded in a polymer to seal in the discrete particles, providing a magnetically anisotropic structure.

Figure 2:
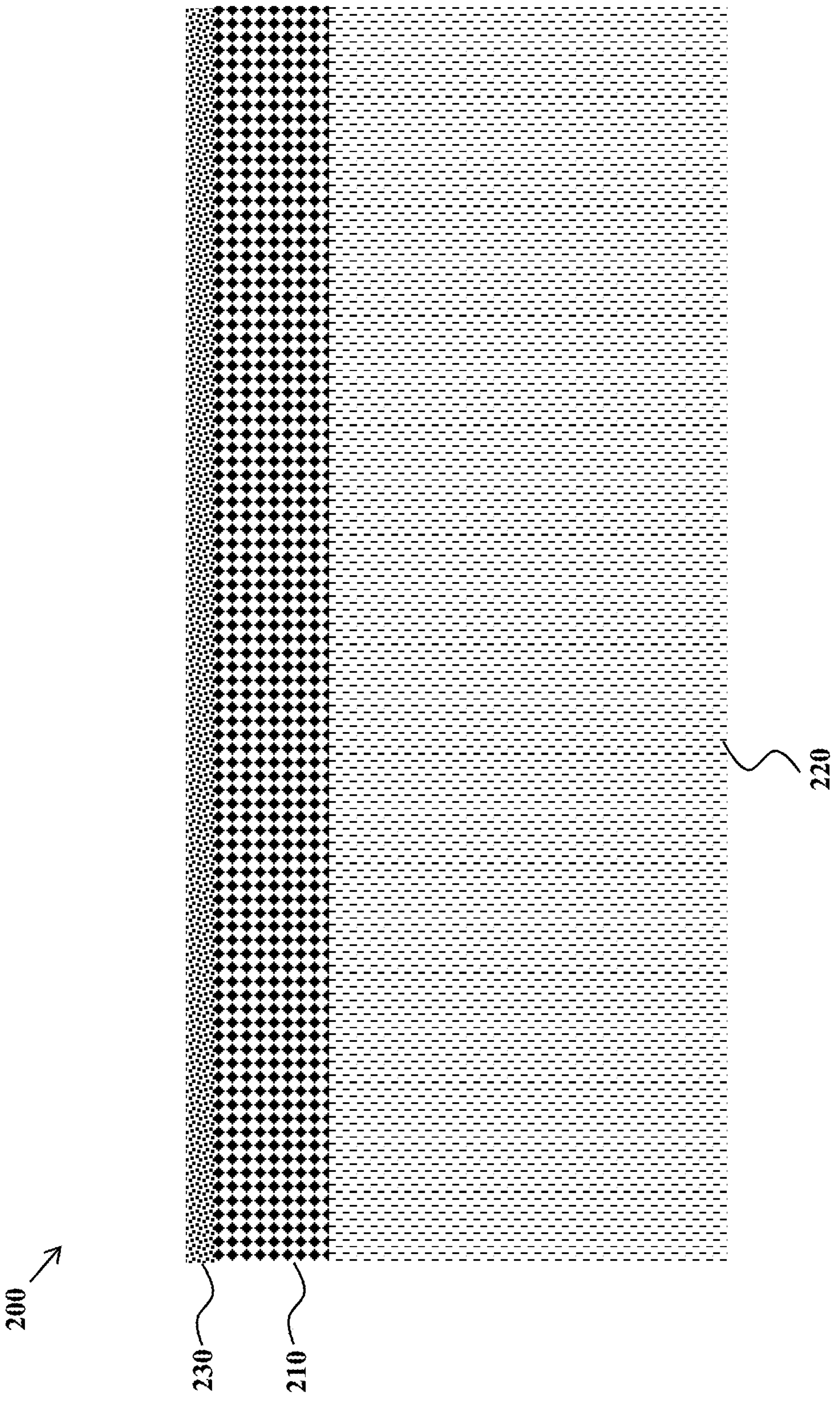
FIG. 2 is a schematic of a magnetically anisotropic structure containing a hexaferrite film deposited on a substrate, in some variations.

FIG. 2 is a schematic of a magnetically anisotropic structure 200. The structure 200 contains a hexaferrite film 210 deposited on a substrate 220. The structure 200 may further comprise an encapsulating layer 230 disposed on top of the hexaferrite film 210. The encapsulating layer 230 may be included to immobilize the hexaferrite film 210 onto the substrate 220, or for other reasons, such as to modify the properties of the overall magnetically anisotropic structure 200. The encapsulating layer 230 may contain a polymer, such as an epoxy, silicones, parylenes, or a combination thereof. The encapsulating layer 230 may contain a metal, such as gold or palladium. The encapsulating layer 230 may contain a metal oxide, such as $Al_2O_3$ or $HfO_2$. The encapsulating layer 230 may contain silicon or a silicon-containing material, such as $SiO_2$.

The hexaferrite film 210 preferably contains hexaferrite particles that are discrete (defined above), and not annealed or sintered together. Although the hexaferrite particles are discrete, they are preferably packed together which means they are touching or near touching in the direction parallel to the substrate surface (see, for example, FIGS. 5 and 8A).

In some embodiments, the discrete magnetic hexaferrite particles have a packing density of at least 50% within the magnetically anisotropic film. The "packing density" is defined as the percentage of maximum theoretical packing for a given particle type. A packing density of 100% therefore means that the particles are perfectly packed. However, there will typically be some void volume, depending on the geometry of the particles; thus, the packing density will typically be less than 100%. In various embodiments, the discrete magnetic hexaferrite particles have a packing density of about, or at least about, 55%, 60%, 65%, 70%, 75%, 80%, 85%, 90%, 95%, or 99%.

In some embodiments, the discrete magnetic hexaferrite particles are stacked in the direction perpendicular to the substrate surface, i.e., the hexaferrite particles are stacked substantially in the direction of the c-axis (normal to the a-axes). Stacked hexaferrite particles may form multiple layers of hexaferrite particles, such as at least 2, 3, 4, 5, 6, 7, 8, 9, or 10 layers, or more. The hexaferrite film 210 preferably contains hexaferrite particles that are both packed and stacked. In some embodiments, the hexaferrite film 210 contains a single layer of hexaferrite particles that are packed, but not stacked.

The hexaferrite film 210 preferably contains hexaferrite particles that are aligned. "Aligned" hexaferrite particles, in this disclosure, means that the c-axis of the hexaferrite particles have a full width at half maximum angular distribution with respect to the average c-axis direction of at most ±20°. In some embodiments, the hexaferrite particles in each layer of the hexaferrite film are characterized by a full width at half maximum angular distribution of the hexaferrite particle c-axis direction of about ±20° or less, such as about ±15° or less, about ±10° or less, or about ±5° or less. In the case of hexagonal shapes, the hexaferrite particles in each layer of the hexaferrite film may be characterized by a full width at half maximum angular distribution of the hexaferrite particle c-axis direction of about ±20° or less, such as about ±15° or less, about ±10° or less, or about ±5° or less. A direction normal to the c-axis for a hexagonal platelet is known as an a-axis (plate axis). Note that there are multiple directions normal to the c-axis which are referred to a-axes. The degree of alignment of a-axes will correlate with the degree of alignment of c-axes, although there can be a difference when various particle sizes and imperfections are present. In the case of hexagonal particles, the thickness is along the c-axis of the particles and is generally much smaller than the particle width (long axis).

In some embodiments, at least 10%, 20%, 30%, 40%, 50%, 60%, 70%, 80%, 90% or more of the hexaferrite particles are substantially aligned with each other. By "substantially aligned" it is meant that two hexaferrite particles are aligned within 5% of each other, measured by the angle between long axes of the two hexaferrite particles.

In some embodiments, at least 10%, 20%, 30%, 40%, 50%, 60%, 70%, 80%, 90% or more of the hexaferrite particles are completely aligned with each other. By "completely aligned" it is meant that two hexaferrite particles are aligned within 1% of each other, measured by the angle between long axes of the two hexaferrite particles. "Perfectly aligned" hexaferrite particles, in principle, are aligned with each other, within measurement error of the angle between the two long axes.

Another measure of hexaferrite particle alignment is the standard deviation of hexaferrite particle long axis angle from the average long axis direction defined by all hexaferrite particles collectively. In the theoretical case of perfect alignment of many hexaferrite particles, the standard deviation is zero. In some embodiments, the standard deviation of hexaferrite particle long axis angle from the average long axis direction defined by all hexaferrite particles collectively is about, or less than about, 25%, 20%, 15%, 10%, 5%, 4%, 3%, 2%, 1%, 0.5%, or 0.1%.

The hexaferrite film 210 preferably contains hexaferrite particles that are monodisperse, not polydisperse. In some embodiments, monodisperse hexaferrite particles are characterized by a polydispersity of less than 30%, preferably less than about 20%, and more preferably less than about 10% standard deviation of average particle width (longest particle dimension), calculated as standard deviation of width divided by average width. In these or other embodiments, the hexaferrite particles may be characterized by a polydispersity of less than about 30%, preferably less than about 20%, and more preferably less than about 10% standard deviation of average particle thickness (shortest particle dimension), calculated as standard deviation of thickness divided by average thickness. Monodisperse hexaferrite particles are desirable for better packing and better magnetic properties of the hexaferrite films produced therefrom.

Some variations of the invention provide a magnetically anisotropic structure produced by a process comprising:

(a) synthesizing or obtaining magnetic hexaferrite particles;

(b) if the magnetic hexaferrite particles are agglomerated, mechanically treating the magnetic hexaferrite particles to form discrete particles;

(c) combining the magnetic hexaferrite particles with a solvent, to generate a dispersion;

(d) depositing the magnetic hexaferrite particles onto a substrate via drying and/or charge-titration assembly, to generate a magnetically anisotropic film of aligned, discrete magnetic hexaferrite particles disposed on the substrate;

(e) optionally embedding the magnetically anisotropic film in a polymer; and (f) recovering a magnetically anisotropic structure containing the magnetically anisotropic film, the substrate, and, if present, the polymer, wherein the maximum processing temperature during said method is 500° C. or less, such as 250° C. or less.

The overall thickness of the final, assembled structure or object (containing assembled hexaferrite particles) may be from about 10 nm to about 1 cm or more, such as about 50 nm, 100 nm, 250 nm, 500 nm, 750 nm, 1 μm, 10 μm, 20 μm, 25 μm, 30 μm, 40 μm, 50 μm, 75 μm, 100 μm, 500 μm, 1 mm, 1 cm, or larger.

The structure containing assembled hexaferrite particles may be present in a device, material, or system selected from the group consisting of magnets, optical devices, coatings, electronic devices, electrochemical systems, and computers, for example.

EXAMPLES

Example 1: Strontium Hexaferrite Synthesis and Isolation 26.6 mg strontium chloride hexahydrate and 215.8 mg iron chloride hexahydrate are dissolved in 1 mL deoxygenated water via a vortex mixer, making a chloride solution. In a separate container, 2.33 g sodium hydroxide is dissolved in 9 mL deoxygenated water with vigorous stirring. The sodium hydroxide solution is purged with nitrogen continuously while stirring for at least 10 min. The chloride solution is added to the sodium hydroxide solution drop by drop while stirring. Finally, the mixture is transferred to a Teflon liner and sealed in a Parr reaction vessel.

The Parr vessel is then placed inside an oven, and the temperature profile is set to reach 220° C. The reaction vessel is held at 220° C. for 10-24 hours to produce $SrFe_{12}O_{19}$ nanoparticles, and then cooled down to room temperature. The final solution is washed with 10 mM nitric acid followed by acetone several times. The $SrFe_{12}O_{19}$ hexaferrite nanoparticles are stored in DI water.

Figure 4:
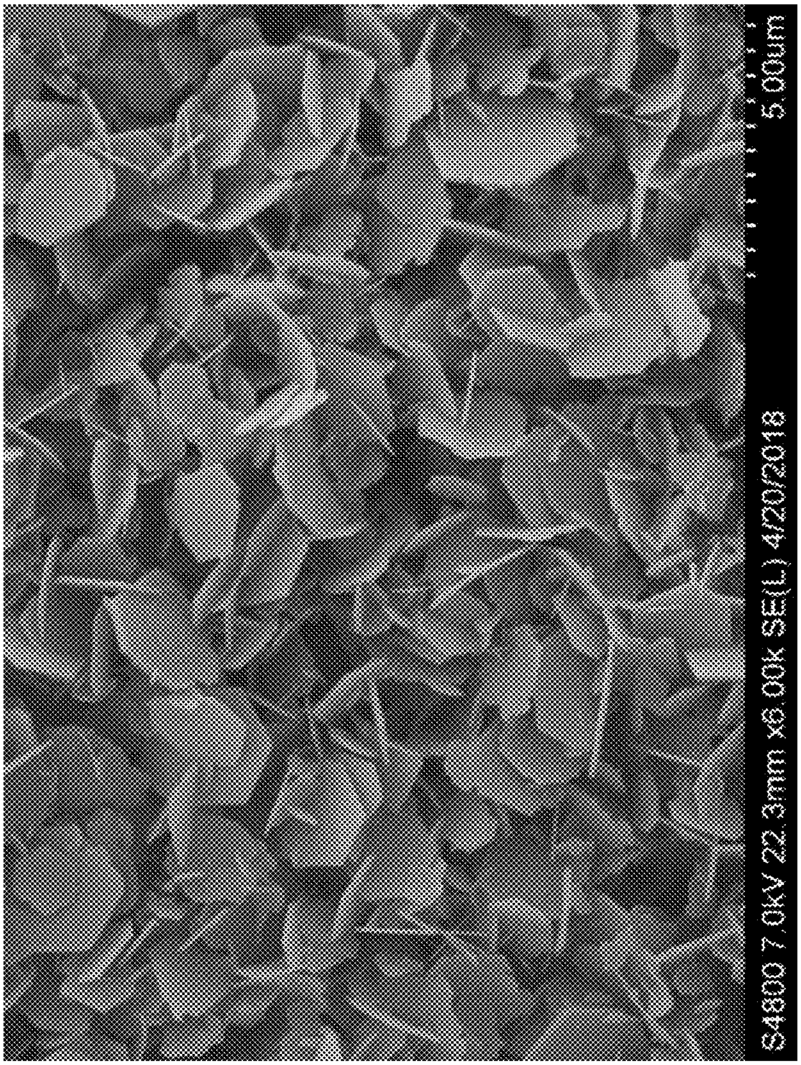
FIG. 4 is an SEM image (scale bar=5 μm) of as-synthesized $SrFe_{12}O_{19}$ nanoparticles, including several intergrown platelets from secondary nucleation, in some embodiments.

FIG. 4 shows an SEM image (scale bar=5 μm) of as-synthesized $SrFe_{12}O_{19}$ nanoparticles, including several intergrown platelets from secondary nucleation. The c-axes of intergrown platelets, aligned along the thickness of the platelets, are in many different directions.

The $SrFe_{12}O_{19}$ nanoparticles are then mechanically agitated and strained to break apart the secondary nucleation, resulting in individualized, isolated plates, as shown in the SEM image (scale bar=10 μm) of FIG. 5. The monolayer of dried particles in FIG. 5 indicates that the c-axes of the platelets are all essentially aligned in the same direction.

Figure 6:
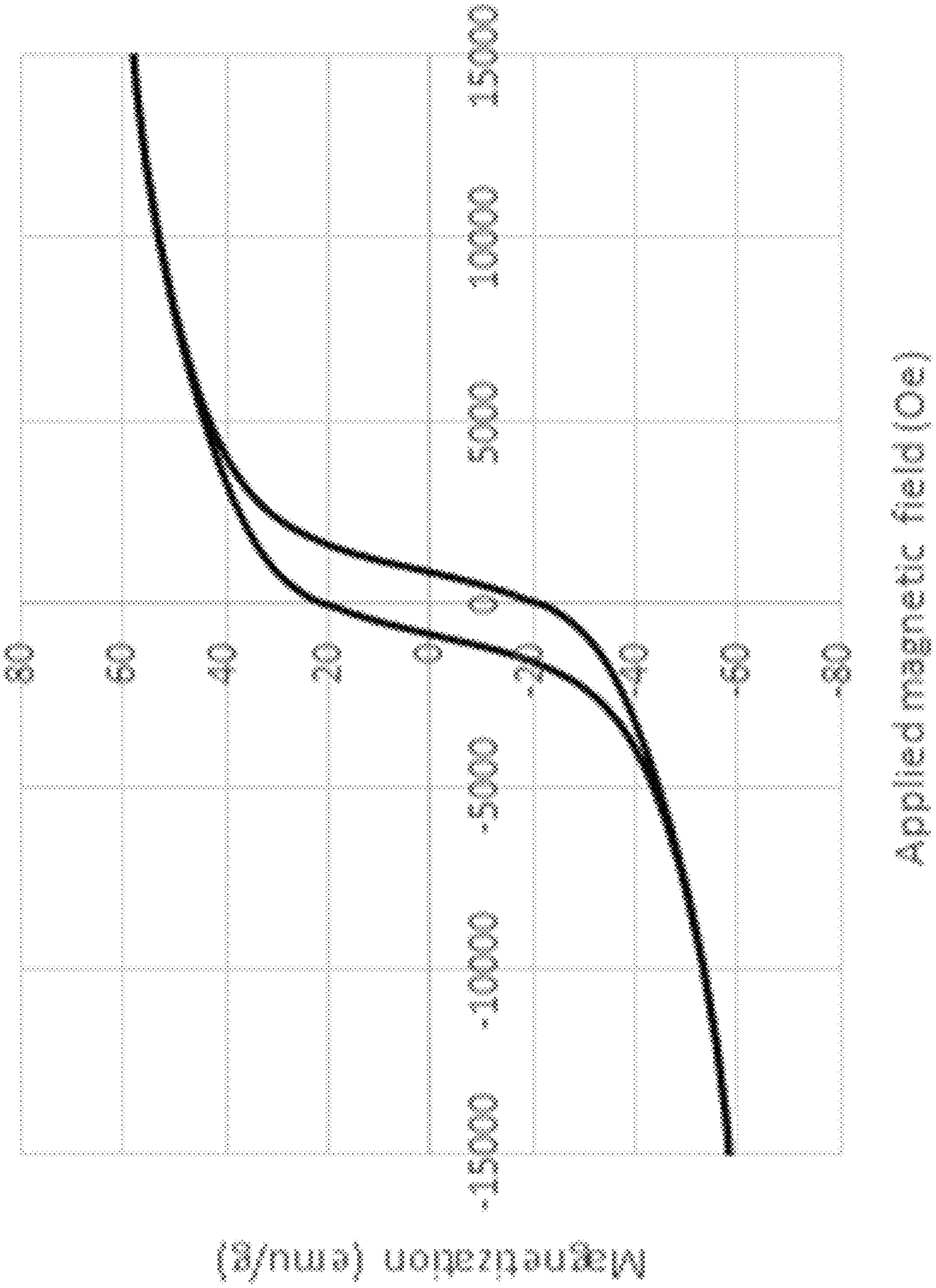
FIG. 6 is a ferromagnetic hysteresis curve of the randomly aligned $SrFe_{12}O_{19}$ platelets, in Example 1.

FIG. 6 is a ferromagnetic hysteresis curve of the randomly aligned $SrFe_{12}O_{19}$ platelets. Vibrating-sample magnetometry (VSM) of the randomly aligned powder shows a ferromagnetic hysteresis curve with a saturation magnetization of 59 emu/g, coercivity of 850 Oersted (Oe), and a remanent magnetization of 36% of the saturation magnetization.

Example 2: $SrFe_{12}O_{19}$ Film Through Drying

A dispersion is prepared with 20 mg/mL of $SrFe_{12}O_{19}$ particles and a 50:50 solvent mixture of DI water and tert-butanol. The solution is vortexed for 30 seconds and then settled for several hours. 20 μL of the bottom layer of the particles is withdraw with a micropipette, and drop-casted on top of a fused silica substrate. The substrate is air-dried in an electromagnetic field at 415 Gauss for 30 minutes, 735 Gauss for 30 minutes, and 1425 Gauss for a minimum of 4 hours.

Figure 7:
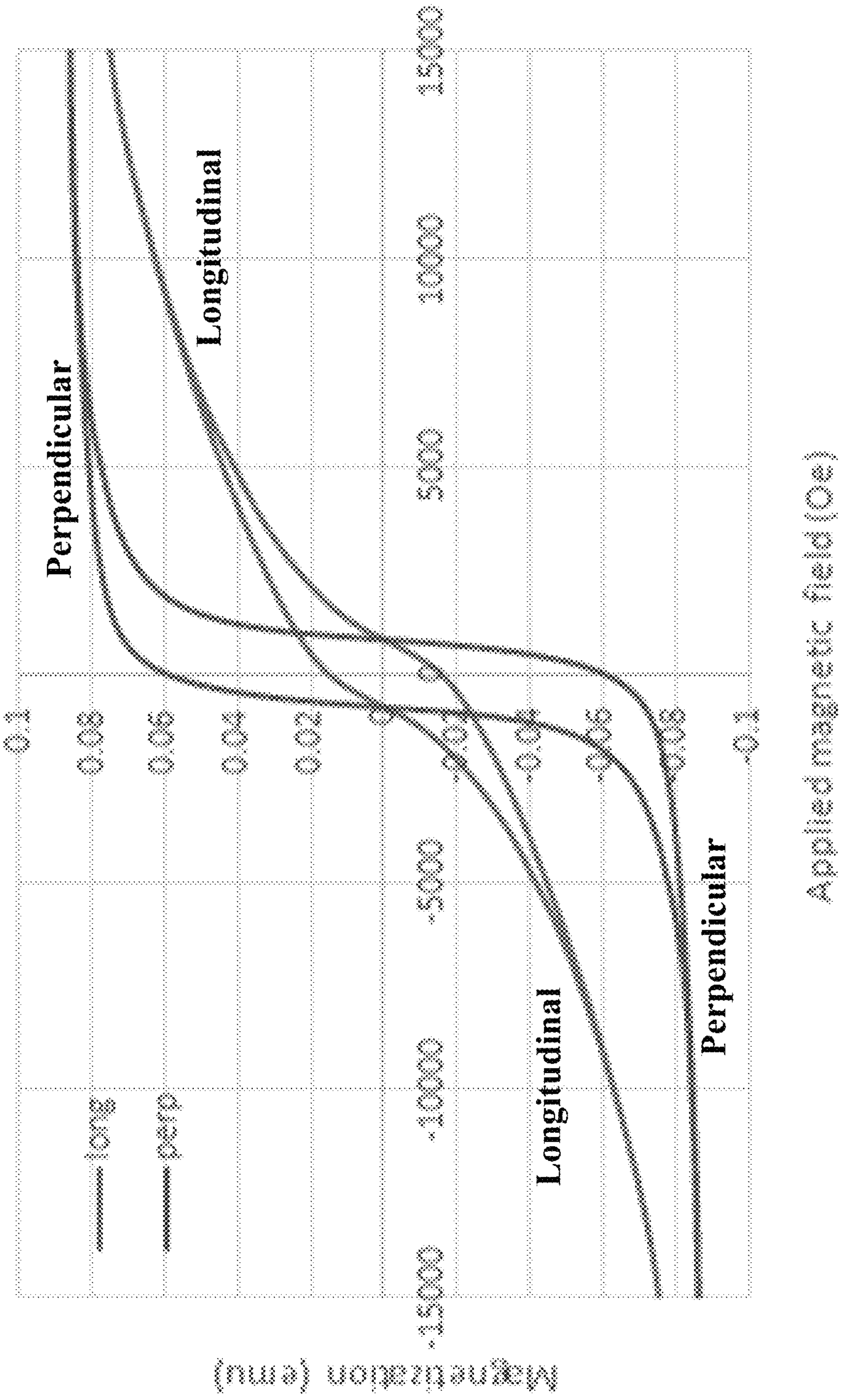
FIG. 7 is a vibrating-sample magnetometry (VSM) ferromagnetic hysteresis curve of the $SrFe_{12}O_{19}$ dried film, showing a remanence-to-saturation magnetization ratio of 0.70, as measured through the thickness of the film (perpendicular to substrate) in Example 2.

FIG. 7 is a VSM ferromagnetic hysteresis curve of the $SrFe_{12}O_{19}$ dried film, showing the remanence-to-saturation magnetization ratio as measured through the thickness of the film (perpendicular to substrate) is 0.70. When measured across the width of the sample, or longitudinal to the substrate, the remanent to saturation magnetization ratio is only 0.20. This is an indication that the particles are well-aligned through the drying process.

The $SrFe_{12}O_{19}$ dried film is shown in the SEM images of FIG. 8A (scale bar=400 μm) and FIG. 8B (scale bar=30 μm). As revealed in FIG. 8B, the hexaferrite film contains $SrFe_{12}O_{19}$ particles that are discrete, and not annealed or sintered together. That is, individual hexagonal shapes are observable in the SEM image. Also, the discrete particles in FIGS. 8A and 8B are relatively monodisperse.

Example 3: Barium Hexaferrite Synthesis and Isolation

To prepare $BaFe_{12}O_{19}$ particles, barium nitrate (0.1 mmol) and iron nitrate nonahydrate (e.g., 0.5 mmol) are dissolved in deoxygenated water (1 mL). Sodium hydroxide (25.7 mmol) and ammonium thiocyanate ligand (e.g., 0.24 mmol) are dissolved in deoxygenated water (9 mL) with vigorous stirring. The sodium hydroxide solution is purged with nitrogen continuously while stirring for at least 10 minutes to inhibit the formation of barium carbonate later in the synthesis. The barium and iron nitrate solution is added drop by drop to the sodium hydroxide solution while stirring. The mixture is heated to 270° C. in a reactor, such as a Teflon-lined Parr vessel. Then the mixture is cooled to room temperature, and washed sequentially with nitric acid (10 mM), acetone, and deionized water. The final $BaFe_{12}O_{19}$ particles are resuspended in deionized water.

$BaFe_{12}O_{19}$ particles are characterized before deposition (such as according to Example 4). The organic weight percent is determined by thermogravimetric analysis. The $BaFe_{12}O_{19}$ particles with thiocyanate ligands showed a 1.4 wt % loss as the temperature increased to burn off the ligands.

Example 4: $BaFe_{12}O_{19}$ Film Through Assembly

Fused silica substrates are prepared by depositing a layer of 3-(trimethoxysilyl)propyl-N,N,N-trimethylammonium chloride. A solution with a ratio of 95:5 percent by weight ethanol:water is mixed. The pH is adjusted to 5.0±0.5 by the addition of acetic acid. Then, 3-(trimethoxysilyl)propyl-N,N,N-trimethylammonium chloride is added to the solution as a 2% by weight addition, and the solution is left to stir for 5 minutes. The fused silica substrates are then immersed in the stirring solution for 10 minutes. Afterwards, the substrates are removed from solution, washed with ethanol, and then dried and annealed at 110° C. for 10-15 minutes. The fused silica substrates coated with 3-(trimethoxysilyl)propyl-N,N,N-trimethylammonium chloride are then placed into a solution of 70,000 g/mol molecular weight carboxymethylcellulose (CMC) in water overnight.

Before deposition, the substrates are washed with water and excess liquid is wicked off. The solution of $BaFe_{12}O_{19}$ nanoparticles is prepared as 10 mL of water with a 5 mg/mL concentration of $BaFe_{12}O_{19}$ particles. The pH of the nanoparticle solution is adjusted to pH 3.0 using 0.1 M hydrochloric acid solution. Then, 0.010 g urea is dissolved into the particle solution. A 60 mL twist-seal Teflon vessel is employed for the reaction. Four of the prepared substrates are placed into the vessel, 10 mL of the nanoparticle solution is added, and the reaction vessel is twisted shut. An environmental chamber is used to control the temperature during the deposition, and an orbital shaker is used to stir the reaction vessel at 110 rpm for the duration of the temperature cycle. The temperature cycle starts at 24° C. for 5 hours, then rises to 90° C. at a rate of 1° C./min. After reaching 90° C., the chamber is held at a temperature of 90° C. for 2 hours, and then gradually cooled down to 24° C. over the course of 8 hours. Once the temperature profile is finished, the reaction vessel is removed from the chamber, and the fused silica substrates are removed from the vessel. The substrates are left to dry after washing with deionized water.

Figure 9:
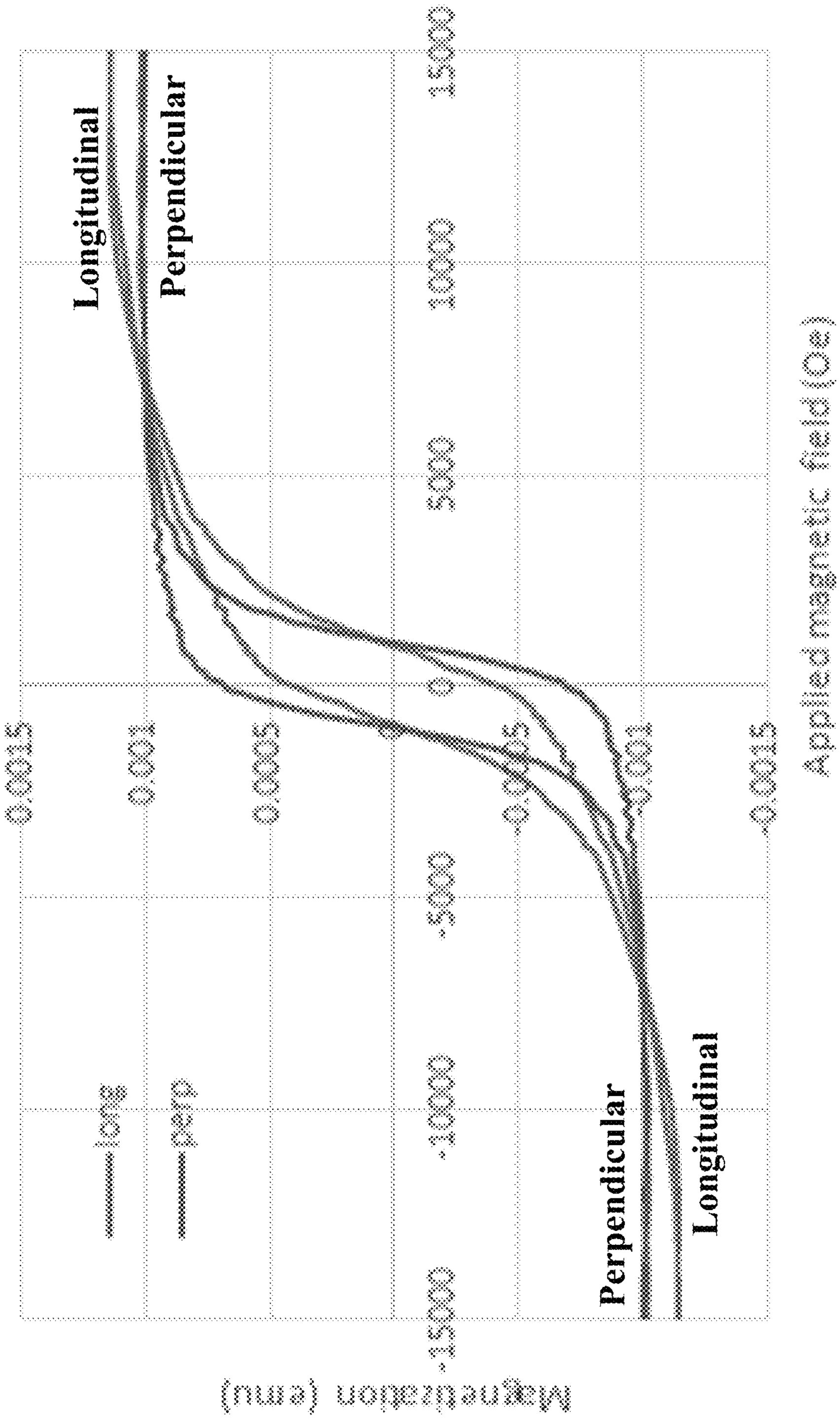
FIG. 9 is a VSM ferromagnetic hysteresis curve of the $BaFe_{12}O_{19}$ assembled film, showing a remanence-to-saturation magnetization ratio of 0.68, as measured through the thickness of the film (perpendicular to substrate), in Example 4.

A film of dried $BaFe_{12}O_{19}$ particles remains on the substrate surface. The resulting $BaFe_{12}O_{19}$ film, though thin, shows a remanent magnetization of 68% when measured through the thickness of the film. FIG. 9 is a VSM ferromagnetic hysteresis curve of the $BaFe_{12}O_{19}$ assembled film, showing a remanent to saturation magnetization ratio, as measured through the thickness of the film (perpendicular), of 0.68.

Example 5: Patterned Film Through Lift-Off Process

Figure 10:
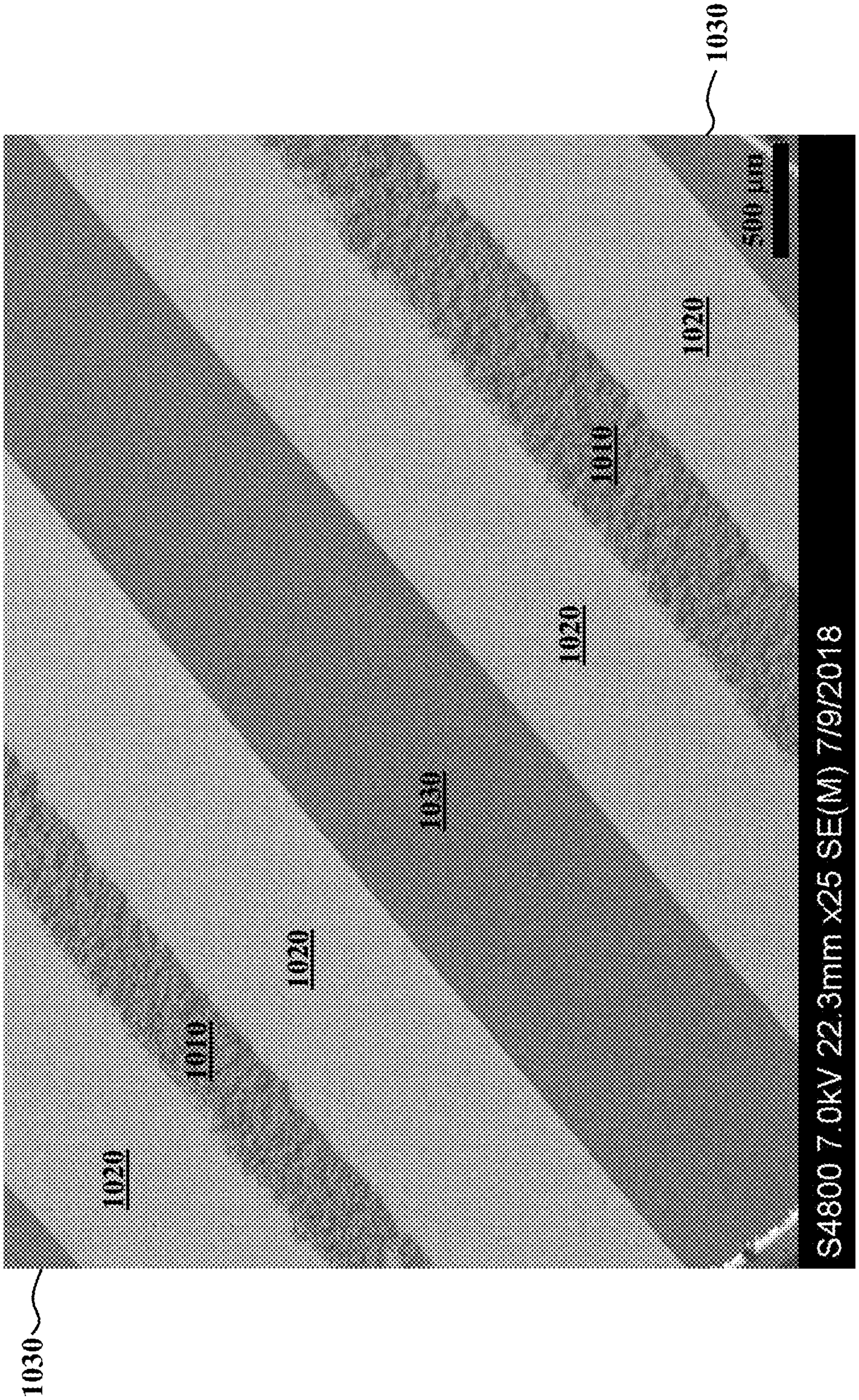
FIG. 10 shows an SEM image (scale bar=500 μm) of a patterned, magnetically anisotropic structure after a lift-off process, in Example 5.

A CMC-coated patterned wafer with radio frequency (RF) metal lines was placed in a container, followed by casting 2 mL of a 20 mg/mL $SrFe_{12}O_{19}$ particle solution on top of the patterned wafer. The container is air-dried in an electromagnetic field of 415 Gauss for 1 hour, 735 Gauss for another hour, and 1425 Gauss for overnight drying. Once the solution is completely dried, the coated wafer is washed with acetone to remove (lift off) the photoresist. FIG. 10 shows an SEM image (scale bar=500 μm) of the patterned structure 1000 after the lift-off process, where layers 1010 are $SrFe_{12}O_{19}$, layers 1020 are gold, and layers 1030 are fused silica.

Comparative Example: Fused Strontium Hexaferrite Particles

Figure 12:
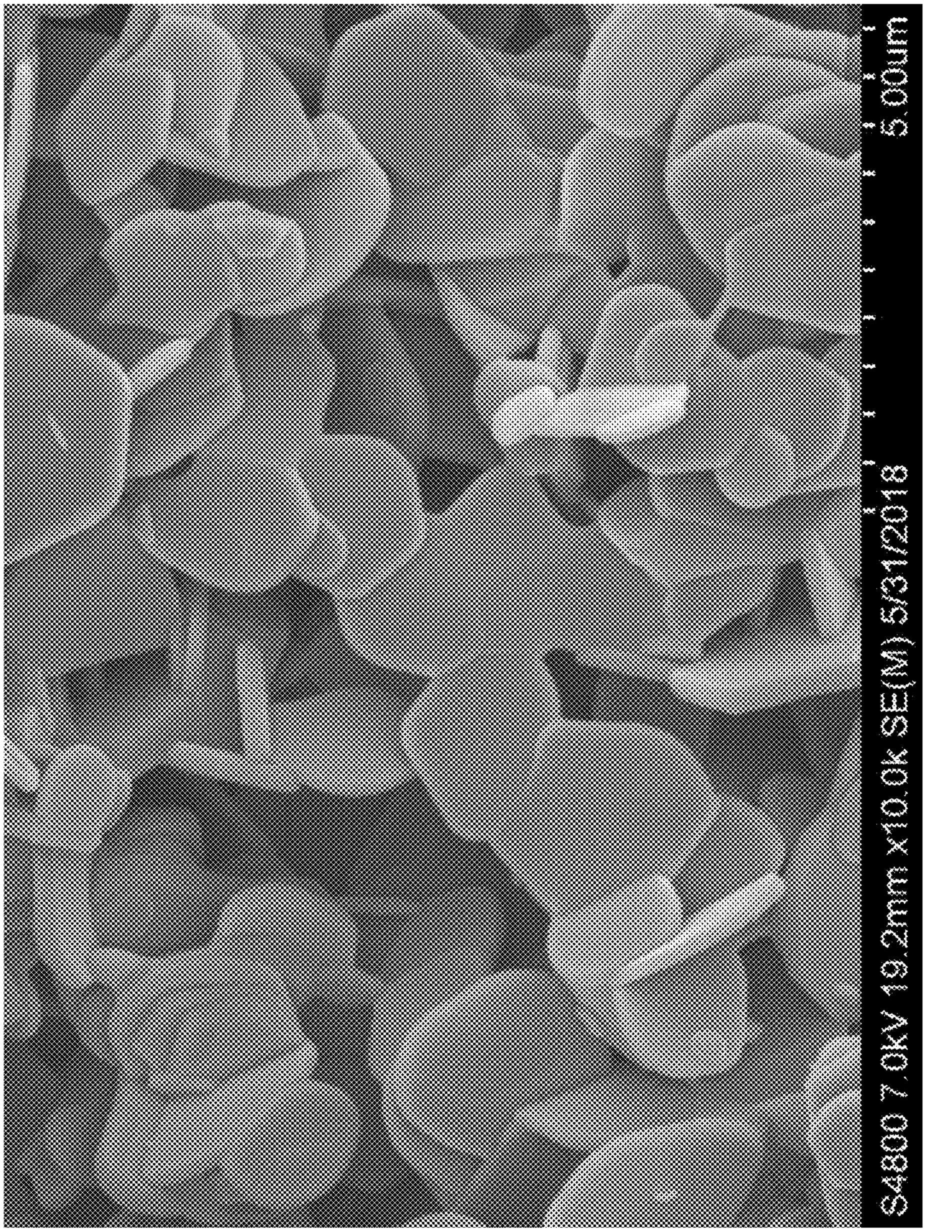
FIG. 12 shows an SEM image (scale bar=5 μm) showing $SrFe_{12}O_{19}$ particles that are annealed at 1100° C., in the Comparative Example.

Strontium hexaferrite particles are annealed in air at 800° C. (FIG. 11) and in air at 1100° C. (FIG. 12). As observed in the SEM images of FIG. 11 (scale bar=3 μm) and FIG. 12 (scale bar=5 μm), the hexaferrite particles are no longer discrete particles. Through the annealing process at 800-1100° C., the hexaferrite particles begin to fuse together, losing their hexagonal shape, compared to unannealed particles shown in FIG. 5. The annealing process of a magnetic particle film is not compatible with other on-chip components.

The structures provided herein are useful in a wide variety of applications, including but not limited to magnetic devices, drive motors, windshield wiper motors, starter motors, commercial aircraft pumps and actuators, magnets, controlled wetting and anti-reflective coatings, optical scattering surfaces, diffractive coatings, and cameras. Integrated magnetic components can be provided, such as micron-thick magnetic thin films from nanoparticles, which are difficult to achieve with top-down fabrication.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method of making a magnetically anisotropic structure, said method comprising:

(a) synthesizing or obtaining magnetic hexaferrite particles;

(b) if said magnetic hexaferrite particles are agglomerated, mechanically treating said magnetic hexaferrite particles to form discrete particles;

(c) combining said magnetic hexaferrite particles with a solvent, to generate a dispersion;

(d) depositing said magnetic hexaferrite particles onto a substrate via drying and/or charge-titration assembly, to generate a magnetically anisotropic film of aligned, discrete magnetic hexaferrite particles disposed on said substrate;

(e) optionally embedding said magnetically anisotropic film in a polymer; and (f) recovering a magnetically anisotropic structure containing said magnetically anisotropic film, said substrate, and, if present, said polymer, wherein the maximum processing temperature during said method is 500° C. or less, and wherein said discrete magnetic hexaferrite particles are aligned with a full width at half maximum angular distribution of the hexaferrite particle c-axis direction of about ±20° or less.

2. The method of claim 1, wherein said maximum processing temperature during said method is 250° C. or less.

3. The method of claim 1, wherein said magnetically anisotropic film does not contain a binder for said discrete magnetic hexaferrite particles.

4. The method of claim 1, wherein said magnetically anisotropic film contains less than 2 wt % organic matter.

5. The method of claim 1, wherein said magnetically anisotropic film is characterized by an average film thickness from about 1 micron to about 500 microns.

6. The method of claim 1, wherein said discrete magnetic hexaferrite particles have a maximum dimension from about 50 nanometers to about 5 microns.

7. The method of claim 1, wherein said discrete magnetic hexaferrite particles have a packing density of at least 50% within said magnetically anisotropic film.

8. The method of claim 1, wherein said discrete magnetic hexaferrite particles contain barium hexaferrite ($BaFe_{12}O_{19}$), strontium hexaferrite ($SrFe_{12}O_{19}$), or a combination thereof.

9. The method of claim 1, wherein said substrate is fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof.

10. The method of claim 1, wherein said magnetically anisotropic film is immobilized onto said substrate with a coating applied to said magnetically anisotropic film and/or to said substrate.

11. The method of claim 1, wherein said substrate is a patterned substrate, and wherein said magnetically anisotropic film is a patterned magnetically anisotropic film.

12. The method of claim 1, said method further comprising disposing said magnetically anisotropic structure on or within an integrated-circuit chip.

13. A method of making a magnetically anisotropic structure, said method comprising:

(a) synthesizing or obtaining magnetic hexaferrite particles;

(b) if said magnetic hexaferrite particles are agglomerated, mechanically treating said magnetic hexaferrite particles to form discrete particles;

(c) combining said magnetic hexaferrite particles with a solvent, to generate a dispersion;

(d) depositing said magnetic hexaferrite particles onto a substrate via drying and/or charge-titration assembly, to generate a magnetically anisotropic film of aligned, discrete magnetic hexaferrite particles disposed on said substrate;

(e) optionally embedding said magnetically anisotropic film in a polymer; and (f) recovering a magnetically anisotropic structure containing said magnetically anisotropic film, said substrate, and, if present, said polymer, wherein the maximum processing temperature during said method is 500° C. or less, and wherein said substrate is fabricated from a substrate material that contains a positive surface charge or a negative surface charge.

14. The method of claim 13, wherein said maximum processing temperature during said method is 250° C. or less.

15. The method of claim 13, wherein said magnetically anisotropic film does not contain a binder for said discrete magnetic hexaferrite particles.

16. The method of claim 13, wherein said magnetically anisotropic film contains less than 2 wt % organic matter.

17. The method of claim 13, wherein said magnetically anisotropic film is characterized by an average film thickness from about 1 micron to about 500 microns.

18. The method of claim 13, wherein said discrete magnetic hexaferrite particles have a maximum dimension from about 50 nanometers to about 5 microns.

19. The method of claim 13, wherein said discrete magnetic hexaferrite particles have a packing density of at least 50% within said magnetically anisotropic film.

20. The method of claim 13, wherein said discrete magnetic hexaferrite particles contain barium hexaferrite ($BaFe_{12}O_{19}$), strontium hexaferrite ($SrFe_{12}O_{19}$), or a combination thereof.

21. The method of claim 13, wherein said substrate is fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof.

22. The method of claim 13, wherein said substrate material is surface-treated with a compound selected from the group consisting of thiols, silanes, alkoxysilanes, phosphonic acids, and combinations thereof, and wherein said compound optionally contains a functional group selected from the group consisting of amine, imine, ammonium, carboxylate, sulfate, phosphate, and combinations thereof.

23. The method of claim 13, wherein said substrate material is surface-treated with a polymer containing a functional group selected from the group consisting of amine, imine, ammonium, carboxylate, sulfate, phosphate, and combinations thereof.

24. The method of claim 23, wherein said polymer is selected from the group consisting of poly(acrylic acid), poly(quaternary ammonium salts), poly(alkyl amines), poly (alkyl carboxylic acids) including copolymers of maleic anhydride or itaconic acid, poly(ethylene imine), poly(propylene imine), poly(vinylimidazoline), poly(trialkylvinyl benzyl ammonium salt), heparin, dextran sulfate, λ-carrageenan, pentosan polysulfate, mannan sulfate, chondroitin sulfate, poly(carboxymethylcellulose), poly(D-lysine), poly (L-lysine), poly(L-glutamic acid), poly(L-aspartic acid), poly(γ-glutamic acid), and combinations thereof.

25. The method of claim 13, wherein said magnetically anisotropic film is immobilized onto said substrate with a coating applied to said magnetically anisotropic film and/or to said substrate.

26. The method of claim 13, wherein said substrate is a patterned substrate, and wherein said magnetically anisotropic film is a patterned magnetically anisotropic film.

27. The method of claim 13, said method further comprising disposing said magnetically anisotropic structure on or within an integrated-circuit chip.

28. A method of making a magnetically anisotropic structure, said method comprising:

(a) synthesizing or obtaining magnetic hexaferrite particles;

(b) if said magnetic hexaferrite particles are agglomerated, mechanically treating said magnetic hexaferrite particles to form discrete particles;

(c) combining said magnetic hexaferrite particles with a solvent, to generate a dispersion;

(d) depositing said magnetic hexaferrite particles onto a substrate via drying and/or charge-titration assembly, to generate a magnetically anisotropic film of aligned, discrete magnetic hexaferrite particles disposed on said substrate;

(e) optionally embedding said magnetically anisotropic film in a polymer; and (f) recovering a magnetically anisotropic structure containing said magnetically anisotropic film, said substrate, and, if present, said polymer, wherein the maximum processing temperature during said method is 500° C. or less, and wherein said magnetically anisotropic film is encapsulated by a polymer selected from the group consisting of epoxies, silicones, poly(p-xylylene), and combinations thereof.

29. The method of claim 28, wherein said maximum processing temperature during said method is 250° C. or less.

30. The method of claim 28, wherein said magnetically anisotropic film does not contain a binder for said discrete magnetic hexaferrite particles.

31. The method of claim 28, wherein said magnetically anisotropic film contains less than 2 wt % organic matter.

32. The method of claim 28, wherein said magnetically anisotropic film is characterized by an average film thickness from about 1 micron to about 500 microns.

33. The method of claim 28, wherein said discrete magnetic hexaferrite particles have a maximum dimension from about 50 nanometers to about 5 microns.

34. The method of claim 28, wherein said discrete magnetic hexaferrite particles have a packing density of at least 50% within said magnetically anisotropic film.

35. The method of claim 28, wherein said discrete magnetic hexaferrite particles contain barium hexaferrite ($BaFe_{12}O_{19}$), strontium hexaferrite ($SrFe_{12}O_{19}$), or a combination thereof.

36. The method of claim 28, wherein said substrate is fabricated from a substrate material selected from the group consisting of glass, silica, fused silica, silicon, silicon carbide, silicon nitride, gallium nitride, gallium arsenide, gold, poly(benzocyclobutene), poly(p-xylylene), and combinations thereof.

37. The method of claim 28, wherein said magnetically anisotropic film is immobilized onto said substrate with a coating applied to said magnetically anisotropic film and/or to said substrate.

38. The method of claim 28, wherein said substrate is a patterned substrate, and wherein said magnetically anisotropic film is a patterned magnetically anisotropic film.

39. The method of claim 28, said method further comprising disposing said magnetically anisotropic structure on or within an integrated-circuit chip.

* * * * *